US008266239B2

(12) United States Patent
Wookey et al.

(10) Patent No.: US 8,266,239 B2
(45) Date of Patent: Sep. 11, 2012

(54) REMOTE SERVICES SYSTEM RELOCATABLE MID LEVEL MANAGER

(75) Inventors: Michael J. Wookey, Santa Clara, CA (US); Trevor Watson, Sheffield (GB); Jean Chouanard, Redwood City, CA (US)

(73) Assignee: Oracle International Corporation, Redwood City, CA (US)

( * ) Notice: Subject to any disclaimer, the term of this patent is extended or adjusted under 35 U.S.C. 154(b) by 3353 days.

(21) Appl. No.: 10/186,073

(22) Filed: Jun. 27, 2002

(65) Prior Publication Data

US 2004/0010575 A1    Jan. 15, 2004

(51) Int. Cl.
*G06F 15/16* (2006.01)
(52) U.S. Cl. ........................................ 709/217
(58) Field of Classification Search ............... 709/217
See application file for complete search history.

(56) References Cited

U.S. PATENT DOCUMENTS

| 5,245,616 | A |   | 9/1993  | Olson ................................. 714/748 |
|-----------|---|---|---------|------------------------------------------------|
| 5,432,798 | A |   | 7/1995  | Blair ................................. 714/748 |
| 5,528,677 | A |   | 6/1996  | Butler et al. ....................... 379/196 |
| 5,541,927 | A |   | 7/1996  | Kristol et al. ..................... 370/94.2 |
| 5,677,918 | A |   | 10/1997 | Tran et al. .......................... 371/32  |
| 5,729,537 | A |   | 3/1998  | Billström ......................... 370/329    |
| 5,805,804 | A | * | 9/1998  | Laursen et al. .................. 709/223      |
| 5,884,316 | A |   | 3/1999  | Bernstein et al. ............... 719/315       |
| 5,892,754 | A |   | 4/1999  | Kompella et al. ............... 370/236        |
| 5,905,871 | A |   | 5/1999  | Buskens et al. ............. 395/200.75        |
| 5,933,140 | A | * | 8/1999  | Strahorn et al. ................ 715/712       |
| 5,974,417 | A |   | 10/1999 | Bracho et al. .................... 707/10      |
| 5,987,514 | A | * | 11/1999 | Rangarajan ..................... 709/224       |
| 6,014,437 | A |   | 1/2000  | Acker et al. ..................... 379/219     |
| 6,023,507 | A | * | 2/2000  | Wookey .......................... 709/224      |
| 6,023,698 | A |   | 2/2000  | Lavey, Jr. et al. ................ 707/10      |
| 6,055,364 | A |   | 4/2000  | Speakman et al. ......... 395/200.59           |
| 6,085,244 | A | * | 7/2000  | Wookey .......................... 709/224      |
| 6,094,688 | A |   | 7/2000  | Mellen-Garnett et al. ..... 709/328            |
| 6,097,720 | A |   | 8/2000  | Araujo et al. ................... 370/355      |
| 6,098,093 | A |   | 8/2000  | Bayeh et al. .................... 709/203      |
| 6,131,112 | A |   | 10/2000 | Lewis et al. .................... 709/207      |
| 6,141,759 | A |   | 10/2000 | Braddy .......................... 713/201      |
| 6,145,096 | A | * | 11/2000 | Bereiter et al. .................. 714/25      |
| 6,148,337 | A | * | 11/2000 | Estberg et al. ................. 709/224       |
| 6,151,683 | A | * | 11/2000 | Wookey ............................ 714/2      |

(Continued)

OTHER PUBLICATIONS

G. Cugola, E. Di Nitto and A Fuggetta, "Exploiting an Event-Based Infrastructure to Develop Complex Distributed Systems" *Software Engineering, 1998. Proceedings of the 1998 International Conference on Kyoto*, Japan Apr. 19-25, 1998.

(Continued)

*Primary Examiner* — Jerry Dennison
(74) *Attorney, Agent, or Firm* — Marsh Fischmann & Breyfogle, LLP; Kent Alan Lembke; Michael C. Martenson

(57) ABSTRACT

A remote services architecture which includes a remote services proxy, an intermediate mid level manager, an applications mid level manager, and an application server coupled to the remote services proxy. The remote services proxy provides communications flow management. The intermediate mid level manager provides data queue management, transaction integrity and redundancy. The intermediate mid level manager is scalable to a customer location or a service provider location based upon the needs of the customer. The applications mid level manager provides data normalization and integration with a mail server data flow. The application server provides persistent storage of remote services infrastructure information.

21 Claims, 21 Drawing Sheets

U.S. PATENT DOCUMENTS

| | | | | |
|---|---|---|---|---|
| 6,154,128 | A * | 11/2000 | Wookey et al. | 340/506 |
| 6,167,431 | A * | 12/2000 | Gillies et al. | 709/203 |
| 6,182,249 | B1 * | 1/2001 | Wookey et al. | 714/47 |
| 6,185,606 | B1 * | 2/2001 | Bereiter | 709/206 |
| 6,216,173 | B1 * | 4/2001 | Jones et al. | 709/231 |
| 6,219,700 | B1 | 4/2001 | Chang et al. | 709/222 |
| 6,237,040 | B1 | 5/2001 | Tada | 709/246 |
| 6,237,114 | B1 * | 5/2001 | Wookey et al. | 714/47 |
| 6,243,451 | B1 | 6/2001 | Shah et al. | 379/201 |
| 6,275,953 | B1 | 8/2001 | Vahalia et al. | 714/11 |
| 6,332,163 | B1 * | 12/2001 | Bowman-Amuah | 709/231 |
| 6,335,927 | B1 | 1/2002 | Elliott et al. | 370/352 |
| 6,338,088 | B1 | 1/2002 | Waters et al. | 709/226 |
| 6,347,374 | B1 | 2/2002 | Drake et al. | 713/200 |
| 6,349,340 | B1 | 2/2002 | Dyer et al. | 709/231 |
| 6,353,854 | B1 | 3/2002 | Cromer et al. | 709/224 |
| 6,357,017 | B1 * | 3/2002 | Bereiter et al. | 714/27 |
| 6,442,571 | B1 | 8/2002 | Haff et al. | 707/201 |
| 6,466,976 | B1 | 10/2002 | Alles et al. | 709/224 |
| 6,466,981 | B1 | 10/2002 | Levy | 709/227 |
| 6,473,794 | B1 | 10/2002 | Guheen et al. | 709/223 |
| 6,523,035 | B1 | 2/2003 | Fleming et al. | 707/10 |
| 6,552,999 | B2 | 4/2003 | Iwase et al. | 370/230 |
| 6,553,129 | B1 | 4/2003 | Rhoads | 382/100 |
| 6,615,258 | B1 | 9/2003 | Barry et al. | 709/223 |
| 6,621,801 | B1 | 9/2003 | Wright et al. | 370/319 |
| 6,633,898 | B1 | 10/2003 | Seguchi et al. | 709/201 |
| 6,640,244 | B1 | 10/2003 | Bowman-Amuah | 709/207 |
| 6,665,754 | B2 * | 12/2003 | Mann | 710/52 |
| 6,687,735 | B1 | 2/2004 | Logston et al. | 709/203 |
| 6,691,165 | B1 | 2/2004 | Bruck et al. | 709/227 |
| 6,691,302 | B1 | 2/2004 | Skrzynski et al. | 717/118 |
| 6,711,611 | B2 * | 3/2004 | Hanhan | 709/218 |
| 6,760,861 | B2 | 7/2004 | Fukuhara et al. | 709/203 |
| 6,765,864 | B1 | 7/2004 | Natarajan et al. | 370/224 |
| 6,779,030 | B1 | 8/2004 | Dugan et al. | 709/223 |
| 6,781,999 | B2 | 8/2004 | Eyuboglu et al. | 370/399 |
| 6,785,728 | B1 | 8/2004 | Schneider et al. | 709/229 |
| 6,792,461 | B1 | 9/2004 | Hericourt | 709/225 |
| 6,822,961 | B1 | 11/2004 | Constantinof et al. | 370/395.2 |
| 6,850,893 | B2 | 2/2005 | Lipkin et al. | 705/8 |
| 6,856,676 | B1 | 2/2005 | Pirot et al. | 379/201.01 |
| 6,868,441 | B2 | 3/2005 | Greene et al. | 709/220 |
| 6,895,586 | B1 * | 5/2005 | Brasher et al. | 719/313 |
| 6,957,260 | B1 | 10/2005 | Mighdoll et al. | 709/225 |
| 2001/0004595 | A1 | 6/2001 | Dent | 455/435 |
| 2001/0034782 | A1 | 10/2001 | Kinkade | 709/219 |
| 2001/0047386 | A1 | 11/2001 | Domenikos et al. | 709/203 |
| 2002/0038340 | A1 | 3/2002 | Whipple et al. | 709/203 |
| 2002/0042849 | A1 | 4/2002 | Ho et al. | 709/329 |
| 2002/0046294 | A1 | 4/2002 | Brodsky et al. | 709/246 |
| 2002/0059425 | A1 | 5/2002 | Belfiore et al. | 709/226 |
| 2002/0065929 | A1 | 5/2002 | Kamentsky et al. | 709/231 |
| 2002/0073236 | A1 | 6/2002 | Helgeson et al. | 709/246 |
| 2002/0087657 | A1 | 7/2002 | Hunt | 709/217 |
| 2002/0114305 | A1 | 8/2002 | Oyama et al. | 370/338 |
| 2002/0136201 | A1 | 9/2002 | Buchsbaum et al. | 370/352 |
| 2002/0156871 | A1 | 10/2002 | Munarriz et al. | 709/219 |
| 2002/0156975 | A1 | 10/2002 | Staub et al. | 711/114 |
| 2002/0174340 | A1 | 11/2002 | Dick et al. | 713/178 |
| 2002/0178262 | A1 * | 11/2002 | Bonnell et al. | 709/225 |
| 2002/0199182 | A1 | 12/2002 | Whitehead | 725/1 |
| 2003/0145117 | A1 * | 7/2003 | Bhat | 709/249 |
| 2003/0237016 | A1 | 12/2003 | Johnson et al. | 714/4 |
| 2004/0002978 | A1 | 1/2004 | Wookey et al. | 707/10 |
| 2004/0221292 | A1 | 11/2004 | Chiang et al. | 719/310 |

OTHER PUBLICATIONS

R. Droms "RFC1541 Dynamic Host Configuration Protocol" *Request for Comments* www.cis.ohio-state.edu/htbin/rfc/rfc1541.html Oct. 1993 (retrieved Dec. 21, 1999).

R. Kowalchuk, R. Hilderman and H. Hamilton "vnews: A Multicast, Multimedia News Service with Virtual Messages" *Computers and Communications, 1996, Conference Proceedings of the 1996 IEEE 15th Annual International*, Mar. 1996.

Fricke Stefan et al., "Agent Based Telematic Services and Telecom Applications" Communications of the AM, Apr. 2001, vol. 44, No. 4, pp. 43-48.

Glenn, Ariel "Access Management of Web-Based Services" D-Lib Magazine, Sep. 1998, http://www.dlib.org/dlib/september98/millman/09millman.html, printed May 10, 2005, pp. 1-14.

Hoffman, Paul "Designs on Internet Mail," Putting it Together, Feb./Mar. 1998, pp. 19-23.

"Java Management API Architecture" Sun Microsystems, Inc., Part No. 805-0084-01, Revision A, Sep. 1996, XP2264630.

"Sun Microsystems JavaBeans" Jul. 24, 1997, Version I, XP2956519.

W. R. Stevens, "TCP/IP Illustrated," Addison-Wesley, vol. 1 pp. 463-464.

D. Comer et al, "Internetworking with TCP/IP Client-Server Programming and Applications," vol. 3, p. 282.

http://dictionary.reference.com/search?q=segmented, printed Apr. 4, 2006.

* cited by examiner

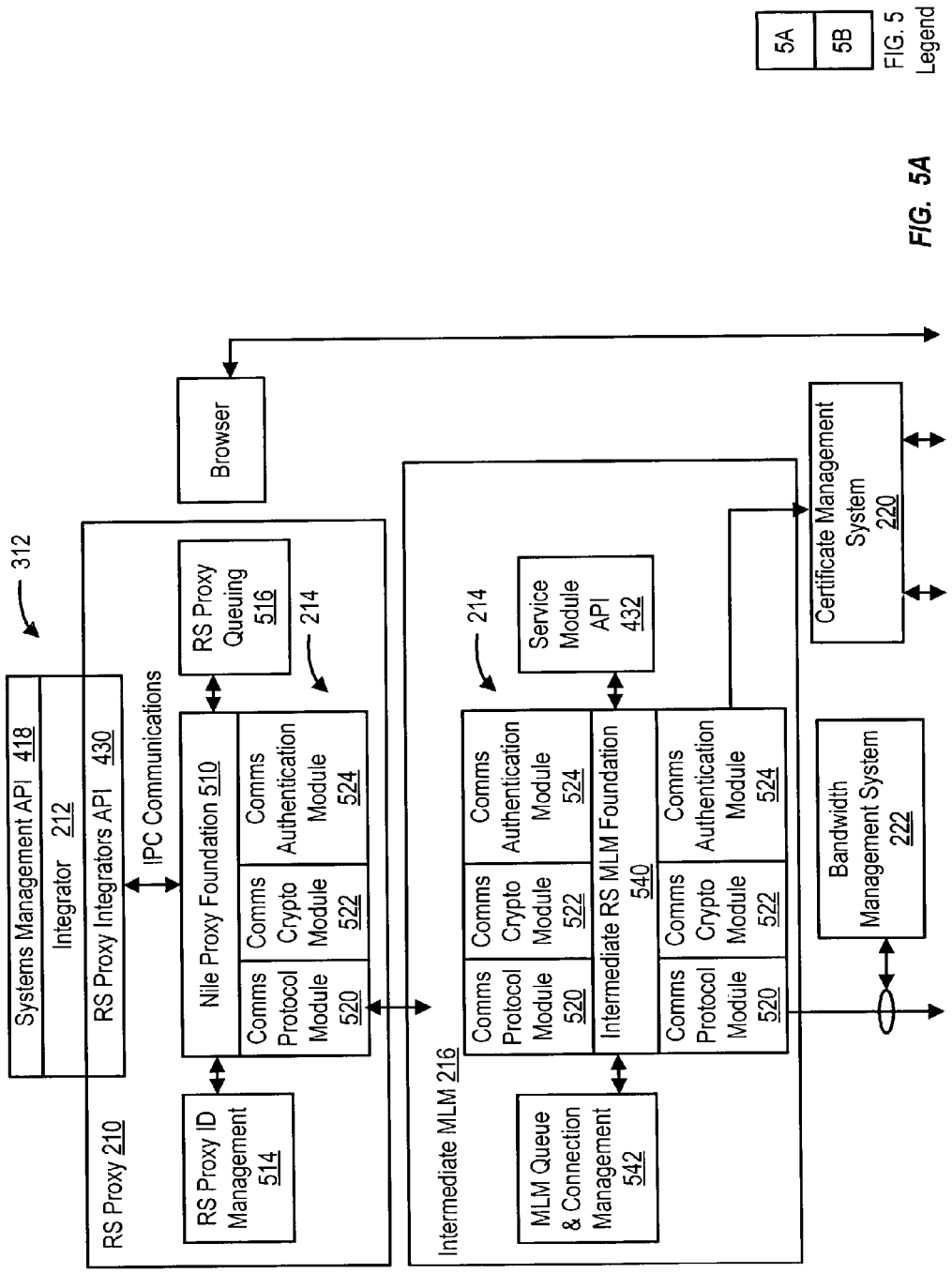

REMOTE SERVICES SYSTEM RELOCATABLE MID LEVEL MANAGER

CROSS REFERENCE TO RELATED APPLICATIONS

This application relates to co-pending U.S. patent application Ser. No. 10/185,557, filed on Jun. 27, 2002, entitled "Remote Services System Communication Module" and naming Michael J. Wookey, Trevor Watson and Jean Chouanard as inventors, the application being incorporated herein by reference in its entirety.

This application relates to co-pending U.S. patent application Ser. No. 10/185,558, filed on Jun. 27, 2005, entitled "Bandwidth Management for Remote Services System" and naming Michael J. Wookey, Trevor Watson and Jean Chouanard as inventors, the application being incorporated herein by reference in its entirety.

This application relates to co-pending U.S. patent application Ser. No. 10/186,106, filed on Jun. 27, 2002, entitled "Remote Services System Service Module Interface" and naming Michael J. Wookey, Trevor Watson and Jean Chouanard as inventors, the application being incorporated herein by reference in its entirety.

FIELD OF THE INVENTION

The present invention relates to remote service delivery for computer networks, and more particularly, to locating mid level managers in multiple locations based upon the needs of the remote service delivery system customer.

BACKGROUND OF THE INVENTION

It is known to provide a variety of services that are delivered remotely to a customer. These services range from point solutions delivering specific service to more complex remote service instantiations supporting multiple services. The technology behind these services has a number of things in common: they are generally a good idea; they provide a valuable service to a set of customers; and, they are generally isolated from one another.

The number of remote services available show the need and demand for such services. However, the fragmentation of the services reduces the overall benefit to the service provider as well as to the customer. The customer is presented with an often confusing issue of which services to use, why the services are different and why the service provider cannot provide a single integrated service.

SUMMARY OF THE INVENTION

In accordance with the present invention, a remote services architecture which includes a remote services proxy, an intermediate mid level manager, an applications mid level manager, and an application server coupled to the remote services proxy. The remote services proxy provides communications flow management. The intermediate mid level manager provides data queue management, transaction integrity and redundancy. The intermediate mid level manager is scalable to a customer location or a service provider location based upon the needs of the customer. The applications mid level manager provides data normalization and integration with a mail server data flow. The application server provides persistent storage of remote services infrastructure information.

In another embodiment, the invention relates to a remote services system which includes a proxy, an intermediate mid level manager, applications mid level manager and an application server coupled to the remote services proxy. The proxy provides means for communications flow management. The intermediate mid level manager provides means for data queue management, transaction integrity and redundancy. The intermediate mid level manager is scalable to a customer location or a service provider location based upon needs of the customer. The applications mid level manager provides means for data normalization and integration with a mail server data flow. The application server, coupled to the remote services proxy, provides persistent storage of remote services infrastructure information.

In another embodiment, the invention relates to a method for providing remote services which includes a remote services proxy, an intermediate mid level manager, an applications mid level manager and an applications server. Communications flow management is provided via the remote services proxy. The intermediate mid level manager provides for data queue management, transaction integrity and redundancy. The intermediate mid level manager provides for a customer location or a service provider location based upon needs of the customer. The applications mid level manager provides for data normalization and integration with a mail server data flow. The application server provides for persistent storage of remote services infrastructure information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A and 5B show a more detailed version of the components of FIG. 2.

DETAILED DESCRIPTION

Figure 1:
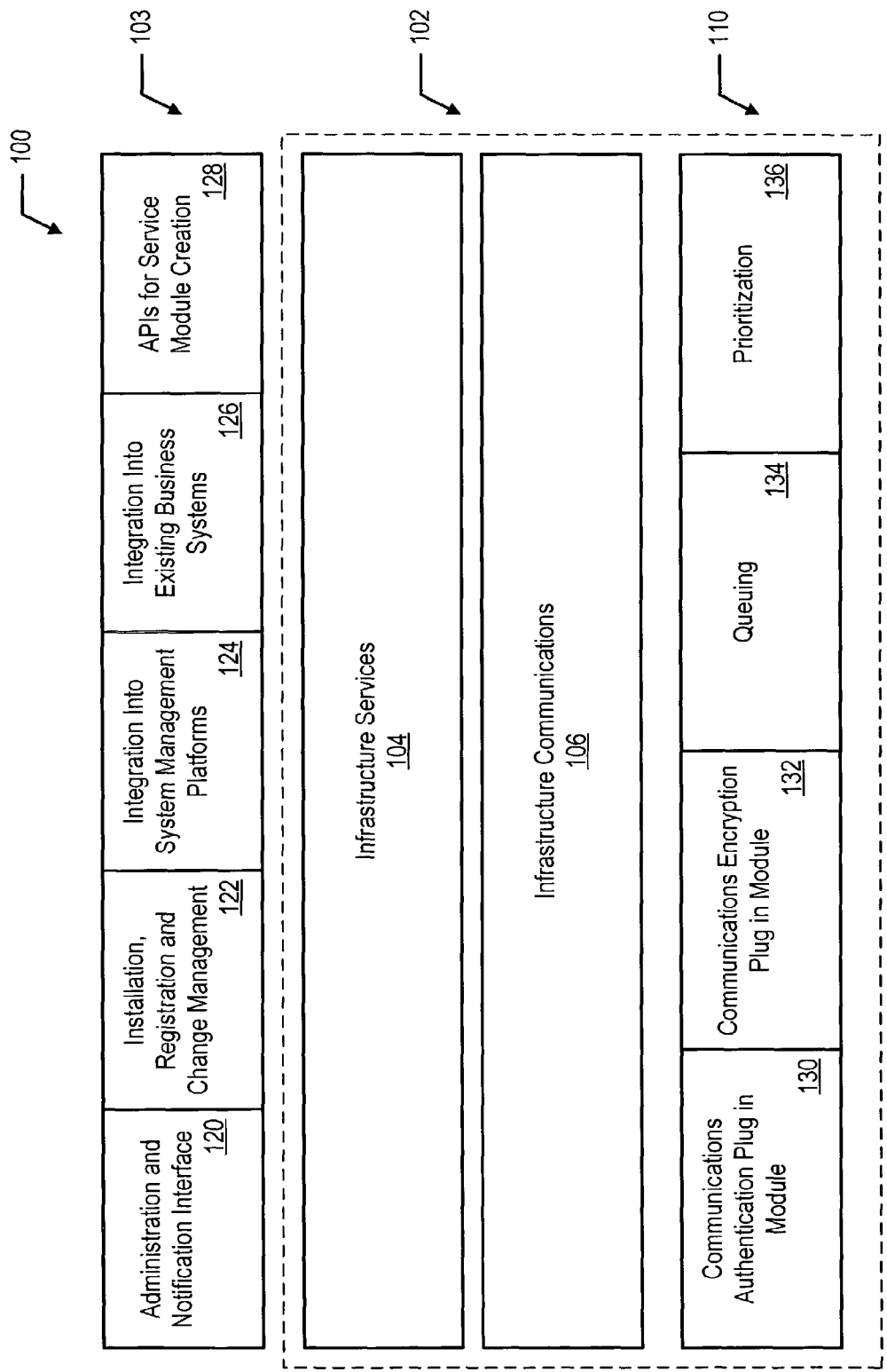
FIG. 1 shows a block diagram of a remote service delivery architecture.

FIG. 1 shows a block diagram of an architecture for a remote service delivery system 100 that meets the needs of both the service provider and the customer. The architecture of the present invention is modularized to provide broad support for both the customer and the service provider in terms of evolution of service functionality to the architecture and within the architecture.

The architecture is broadly comprised of the remote service infrastructure 102, a group of service modules 103 and a plurality of communications modules 110. The remote services infrastructure 102 provides reliable remote service delivery and data management. The remote services infrastructure 102 supports the needs of a service creator by focusing the service creator on the needs and the design of the service by eliminating the need for the service creator to be concerned about how data is transferred and managed to and from a customer site.

The remote services infrastructure 102 provides an interface to support the development of services that use a set of common service parameters to develop customized services for a specific service provider or customer. The infrastructure 102 is separately segmented from, but actively interacts with, the service modules 103.

Within the group of software modules 103 are individual software modules that analyze data collected by the remote services infrastructure 102 and provides service value based on that data to a customer. Thus, the remote services infrastructure 102 and the service modules 103 can be differentiated as follows: the remote services infrastructure 102 is concerned with how data is collected, while the service module 103 is concerned with what is done with the data.

The remote services infrastructure 102 includes an infrastructure services portion 104 and an infrastructure communications portion 106. The infrastructure services portion 104 interacts with the plurality of service modules 103, as described in greater detail below. The remote services infrastructure 102 provides a set of application program interfaces (API's) that are used by a service module developer to leverage common services of the infrastructure such as database access, software delivery and notification services. The infrastructure communications portion 106 includes a plurality of communications modules 110.

The infrastructure services portion 104 interacts with a plurality of service modules 103. Examples of service modules that the remote services architecture may include are an administration and notification interface module 120, an installation, registration and change management module 122, an integration into system management platforms module 124, an integration into existing business systems module 126 and an API's for service module creation module 128. The administration and notification interface 120 allows a customer and service provider to control the remote services infrastructure. The installation, registration and change management module 122 supports the infrastructure and service modules deployed on top of the infrastructure. The module 122 may include automatic registration of new software components, delivery of software and detection of changes within an environment. The integration into systems management platforms module 124 provides an integration point to systems management platforms in general. The integration into existing business systems module 126 allows the remote services infrastructure 102 to integrate into existing business systems to leverage data, processing capacities, knowledge and operational process. The module 126 allows the infrastructure 102 to integrate into the required business systems and provides interfaces to the service module creator to use those systems. The API's for service module creation module 128 allows a service module creator to abstract the complexity of remote data management. The module 128 provides an API of abstracted services to the service module creator.

The infrastructure communications portion 106 provides an abstraction of different protocol and physical network options. Examples of protocol options include an HTTP protocol and an email protocol. Examples of physical network options include Internet based communications, private network based communications and fax communications. The different protocol and physical network options are provided to meet the needs of as many customers as possible.

The infrastructure communications portion 106 supports a number of plug-in communications modules 110. Examples of the communications modules 110 include a communications authentication module 130, an encryption module 132, a queuing module 134, and a prioritization module 136. The communications authentication module 130 is related to the communications protocol that is used and provides the customer with authentication of a communication session. The encryption module 132 is related to the protocol being used and provides encryption of the data stream. The queuing module 134 provides the ability of the infrastructure to queue data being sent through the infrastructure to provide data communications integrity. The prioritization module 136 provides the ability for data within the system to be prioritized for delivery.

Figure 2:
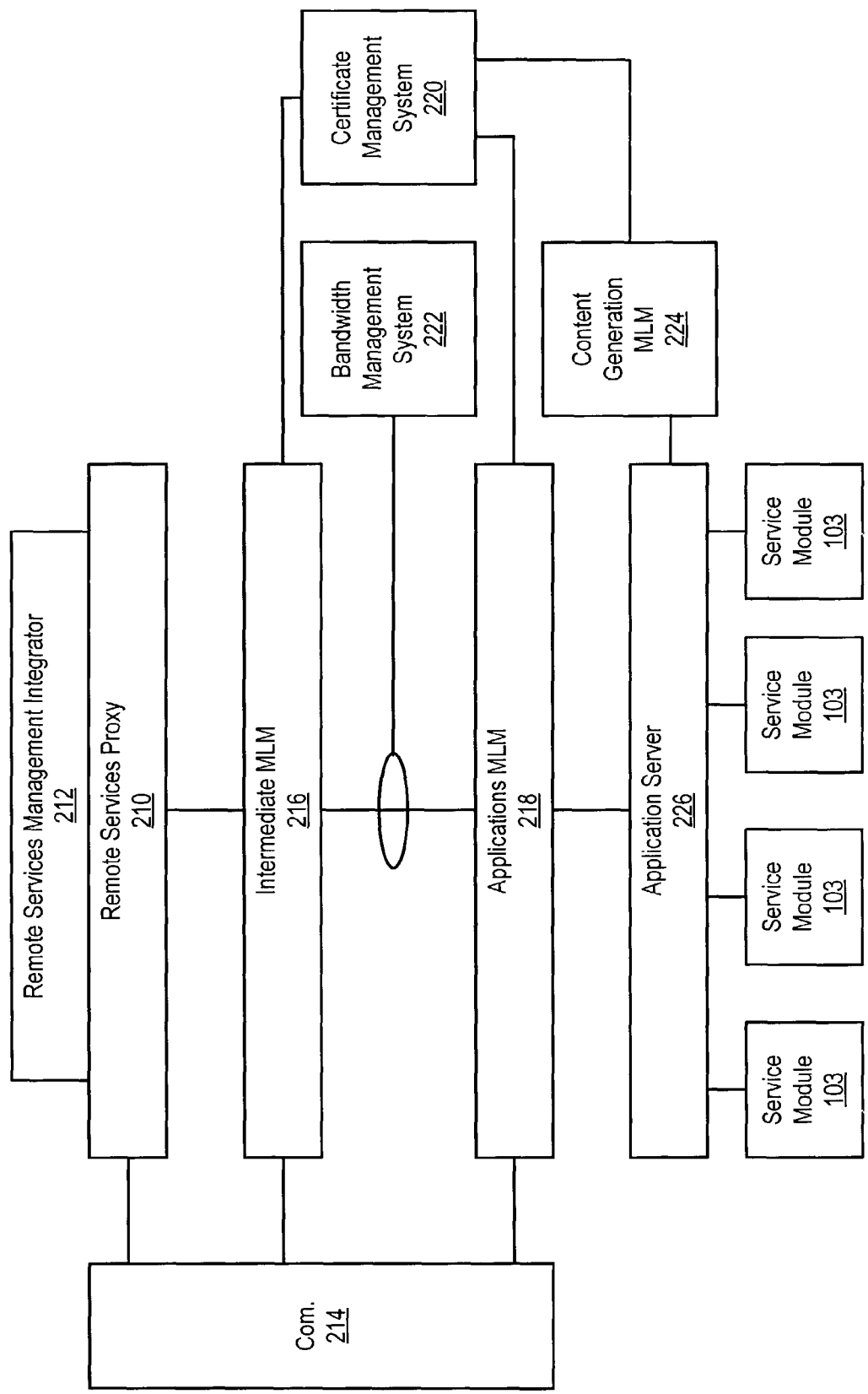
FIG. 2 shows a schematic block diagram of the components relating to the remote services infrastructure.

Referring to FIG. 2, the remote services infrastructure architecture 205 includes a plurality of components. More specifically, the remote services infrastructure architecture 205 includes a remote services proxy 210, a remote services system management integrator 212, a remote services communications module 214, an intermediate mid level manager (MLM) 216 (which may be a customer MLM or an aggregation MLM), an applications MLM 218, a certificate management system 220, a bandwidth management system 222, a remote services content generation MLM 224, a remote services application server 226. The remote services infrastructure architecture 205 interacts with a plurality of external service modules 103.

The remote services proxy 210 provides an API to the systems management systems. This API supports data normalization to the remote services data format. The remote services proxy 210 also provides receptors for the communications modules and in turn provides communications flow management using queuing. The remote services proxy 210 also manages allocation of remote services identifiers (ID's), which are allocated to each component of the remote services infrastructure, and the support instances that are registered with the remote services system 100.

The remote services system management integrators 212 are written to a remote services integrator API supported by the remote services proxy 210. One remote services proxy 210 can support many integrators (also referred to as integration modules). The integration modules provide the glue between the remote services system 100 and the systems management platform. There is at least one integration module for each support systems management platform.

The remote services communications modules 214 provide protocol, encryption and communications authentication. These modules plug-in through a semi-private interface into the remote services proxy 210, the intermediate MLM 216 and the remote services application MLM 218.

The intermediate MLM 216 may be either a customer MLM or an aggregation MLM. The remote services customer MLM is an optional deployable component. The remote services customer MLM provides a higher level of assurance to the customer-deployed environment, providing transaction integrity, redundancy and data queue management. The remote services customer MLM also provides an extensible environment through an API where service module components can be deployed. When no customer MLM is deployed, the aggregation MLM, hosted by the remote services provider and handling multiple customers, provides the data queue management, transaction integrity and redundancy. While the customer MLM is very similar to an aggregation MLM, a customer MLM may be required by a service module that needs to be localized. An aggregation MLM, being shared by multiple customers, may not be customizable.

The applications MLM 218 provides a series of functions that can exist on different MLM instantiations as applicable. The applications module provides data normalization, integration with the mail server data flow and integration with the certificate management system 220. This module acts as the gateway to the remote services application server 226 and controls data access.

The certificate management system 220 provides management of certificates to verify connection authentication for the remote services system 100. The certificate management system 220 may be horizontally scaled as necessary to meet the load or performance needs of the remote services system 100.

The bandwidth management system 222 provides control over bandwidth usage and data prioritization. The bandwidth management system 222 may be horizontally scaled as necessary to meet the load or performance needs of the remote services system 100.

The remote services content generation MLM 224 provides HTML content based on the data held within the remote services application server 226. This module provides a high level of HTML caching to reduce the hit rate on the application server for data. Accordingly, visualization of the data is done through the content generation MLM 224. Separating the visualization processing in the content generation MLM 224 from the data processing in the applications server 226 provides two separate scale points.

The remote services application server 226 provides the persistent storage of remote services infrastructure information. The application server 226 also provides the data processing logic on the remote services infrastructure information as well as support for the service module API to create service module processing within the application server 226. The application server 226 provides access to directory services which support among other things, IP name lookup for private network IP management. The application server 226 also provides access to the service modules 103.

In operation, the remote services proxy 210 uses the communication module 214 to connect to the intermediate MLM 216, whether the intermediate MLM is a customer MLM or an aggregation MLM. The applications MLM 218 and the intermediate MLM 216 use the certificate management system 220 to validate connections from customers. Dataflow bandwidth between the intermediate MLM 216 and the applications MLM 218 is controlled by the bandwidth management system 222. Data that has been formatted by the applications MLM 218 is sent on to the application server 226 for processing and persistent storage.

The content generation MLM 224 provides visualization and content creation for users of the remote services system 100. Remote services infrastructure administration portal logic is deployed to the content generation MLM 224 to provide users of the remote services system 100 with the ability to manage the remote services system 100.

All of the remote services components are identified by a unique remote services identifier (ID). A unique customer remote services ID is generated at customer registration. For remote services infrastructure components, remote services IDs are generated, based on the customer remote services ID, at a component registration phase. For remote services entities reporting to a remote services proxy 210, such as a support instance or an integration module, the remote services ID is allocated by the proxy 210 itself, based on the remote services ID of the proxy 210.

Within the remote services architecture, there are instances where detection, collection and management logic (also referred to as systems management logic) may have already been created by another service module. In this instance, the service module creator reuses this functionality. The reuse then creates a more complex relationship within the system to be managed. The segmentation and re-use of data is available within the architecture. Instrumentation is made up of a large number of small data types. These data types are shared by the different service modules 103 using a publish and subscribe model.

Figure 3:
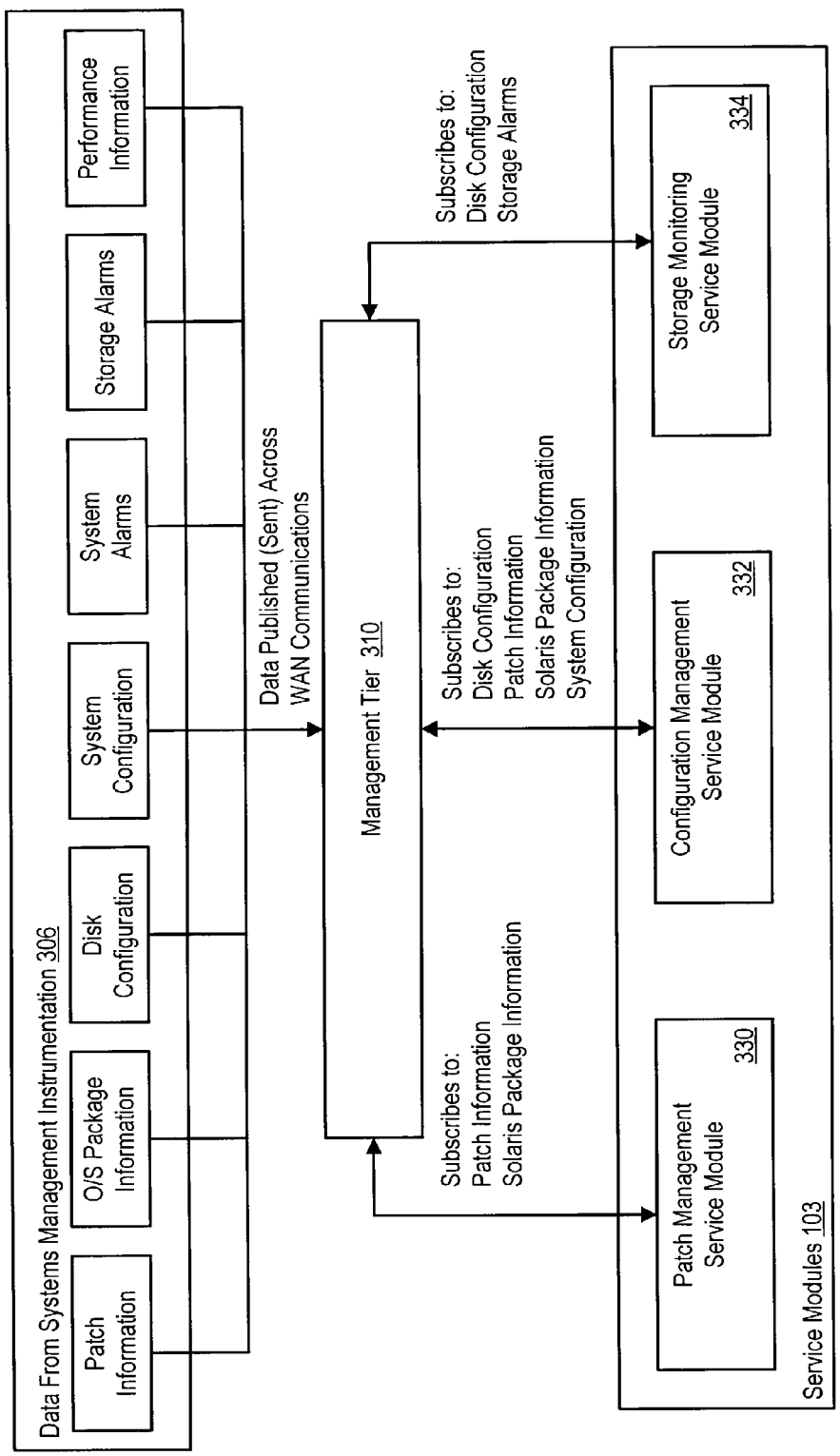
FIG. 3 shows a publish and subscribe example using the remote services delivery architecture.

In a publish and subscribe model, the remote services proxies (and therefore the systems management systems) publish their data to a service provider. The service modules 103 register interest in specific types of data that are needed to fulfill the respective service module processing. FIG. 3 provides an example of the publish and subscribe model using example data and services.

More specifically, data from a systems management instrumentation proxy 306 may include patch information, operating system package information, disk configuration information, system configuration information, system alarms information, storage alarms information and performance information. This information is published via, e.g., a wide area network (WAN) to a management tier 310. Various service modules 103 then subscribe to the information in which they are respectively interested. For example, a patch management service module 330 might be interested in, and thus subscribe to, patch information and operating system package information. A configuration management service module 332 might be interested in, and thus subscribe to, the disk configuration information, the patch information, the operating system package information and the system configuration information. A storage monitoring service module 334 might be interested in, and thus subscribe to, disk configuration information and storage alarms information.

Thus, with a publish and subscribe model, many different types of data are published by a customer using the remote services customer deployed infrastructure. Service modules then subscribe to these data types. More than one service module 103 can subscribe to the same data. By constructing the instrumentation data in a well segmented manner, the data can be shared across many services.

Sharing data across many services reduces duplication of instrumentation. By making data available to newly developed service modules, those service modules need to only identify instrumentation that does not exist and reuse and potentially improve existing instrumentation. Sharing data across multiple services also reduces load on customer systems. Removing the duplication reduces the processing load on the customer's systems. Sharing data across multiple services also reduces development time of service modules 103. As more instrumentation is created and refined, service modules 103 reuse the data collected and may focus on developing intelligent knowledge based analysis systems to make use of the data.

Accordingly, the separation and segmentation of the infrastructure from the service modules enables services to be created in a standardized manner ultimately providing greater value to the customer.

Figure 4:
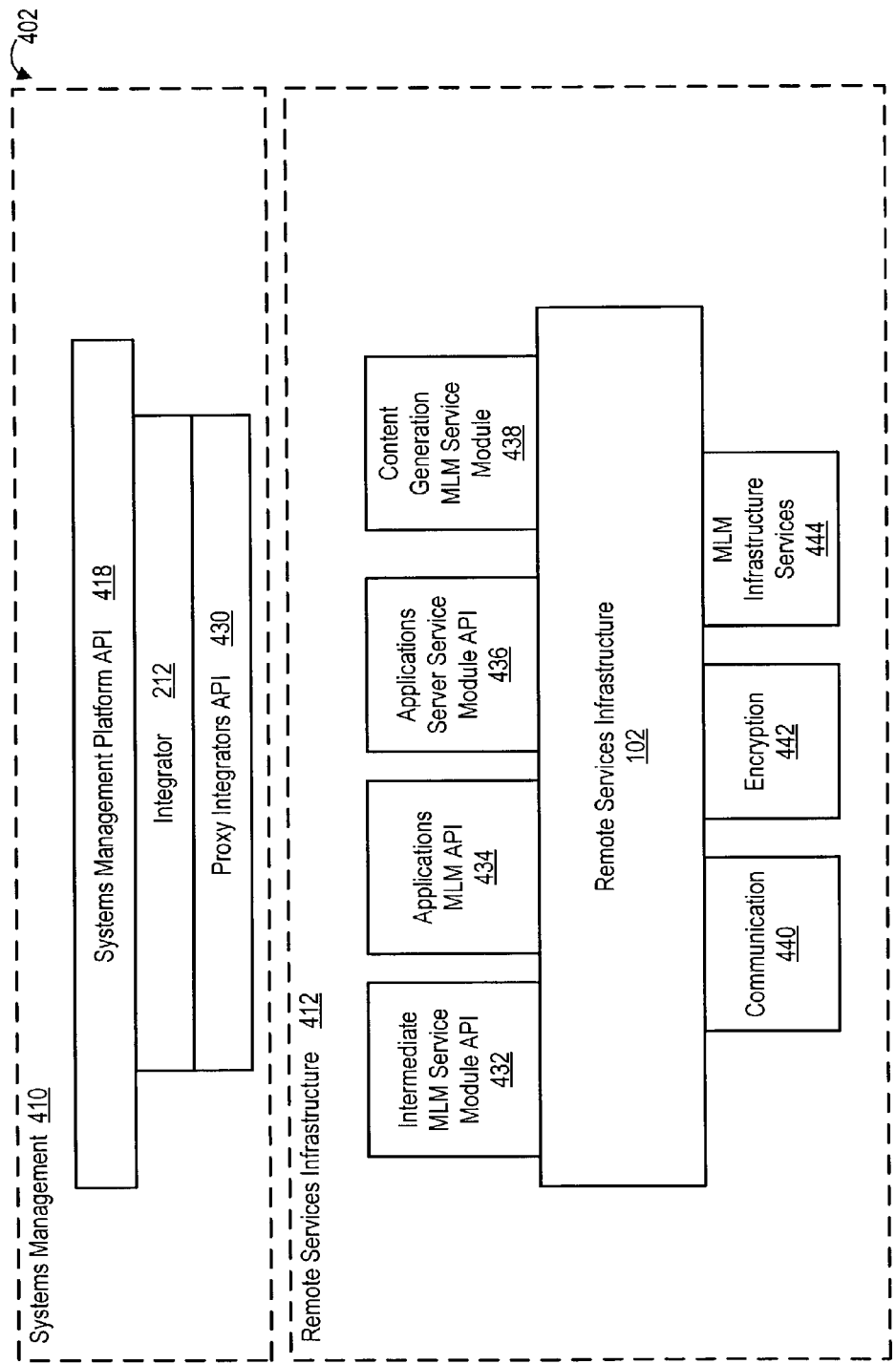
FIG. 4 shows a block diagram of the application program interfaces (API's) of the remote service delivery architecture.

Referring to FIG. 4, the remote services architecture includes a remote services API 402 which may be conceptualized in two areas, systems management API's 410 and remote services infrastructure API's 412.

The systems management API's 410 includes systems management API's 418, integrator 212 and proxy integrators API 430. The proxy integrator API 430 interfaces with integrator module service logic. The integrator module service logic is a general term for the configuration rules that are imparted on the systems management system to collect or detect the information for the integrator 212. While the proxy integrator API's 430 are not technically a part of the remote services system 100, the proxy integrator API 430 is used within the integration modules which form the boundary between the remote services system 100 and the system management. The integration module creator provides the instrumentation to fulfill the collection and detection needs of the service via the systems management API 418.

The proxy integrators API 430 provides an interface between the systems management system and the remote services infrastructure 102. This interface provides a normalization point where data is normalized from the system management representation to a remote services standard. By normalizing the data, the remote services system 100 may manage similar data from different systems management systems in the same way. The proxy integrators API 430 interfaces with the remote services proxy 210 as well as the systems management integrator 212.

The remote services infrastructure API's are used by a service module creator and the systems management integrator 212. The remote services infrastructure API's 412 include an intermediate MLM Service Module API 432, an applications MLM API 434 and an applications server service module API 436 as well as a content generation MLM service module API 438. These API's provide the interface with the remote services infrastructure 102.

The intermediate MLM Service Module API 432 describes a distributed component of the infrastructure. The intermediate MLM service module API 432 allows modules to be loaded into this distributed component that provides mid data stream services such as data aggregation, filtering, etc. The intermediate MLM service module API 432 provides access and control over the data that flows through the intermediate MLM 216 to the service module provider. The intermediate MLM service module API 432 allows intercept of data upstream and on the back-channel to mutation, action and potential blocking by the service modules 103. The intermediate MLM service module API 432 interfaces with a service module creator as well as with the intermediate MLM 216 and intermediate MLM based service modules.

The applications MLM API 434 allows additional modules to be loaded on the applications MLMs. The applications MLM API 434 allows modules to be built into the applications MLMs 218 such as data normalization. The applications MLM API 434 interfaces with the applications MLMs 218 and modules within the applications MLM 218.

The applications server service module API 436 provides all of the needs of a data processing service module. The applications server service module API 436 provides access to many functions including data collected through a database and access to a full authorization schema. The applications service module API 436 is based around the J2EE API. The applications service module API 436 provides a rich interface for service module creators to interact with and build services based on Enterprise Java Beans (EJB's) and data available to them. The application server service module API 436 interfaces with the remote services application server 226 and the service modules 103.

The content generation MLM API 438 is based around the J2EE web container and provides the service module creator a way of building a browser based presentation. The content generation API 428 interfaces with the content generation MLM 224 as well as with MLM generation based service modules.

The remote services infrastructure API's 412 also include a plurality of communication interfaces which are based around the extendibility of the remote services communications system. The communication interfaces include a communication protocol module 440, a communication encryption module 442 and an MLM infrastructure services portion 444. The communications interfaces interface with the remote services proxy 210 as well as all of the remote services system MLM's. The communications interfaces provide an interface between the communications modules and the components that use the communications modules.

The communications protocol module 440 provides support of the application level protocol that is used for the communication through the system. Modules of this type interface to support the use of Email and HTTP communications protocols. The communication protocol module 440 interfaces with remote services communications engineering personnel.

The communications encryption module 442 supports plug-in encryption modules. The plug-in encryption modules can either provide encryption at the protocol level or encryption of the data within the protocol. The communication encryption module 442 interfaces with remote services communications engineering personnel.

The MLM infrastructure services portion 444 represent a number of services that are included within the MLM that provide services that are relevant to the infrastructure 102. These services manage and manipulate the data as it passes through the different parts of the architecture. These services, such as queuing, utilize an API to access and manipulate the API.

Figure 5B:
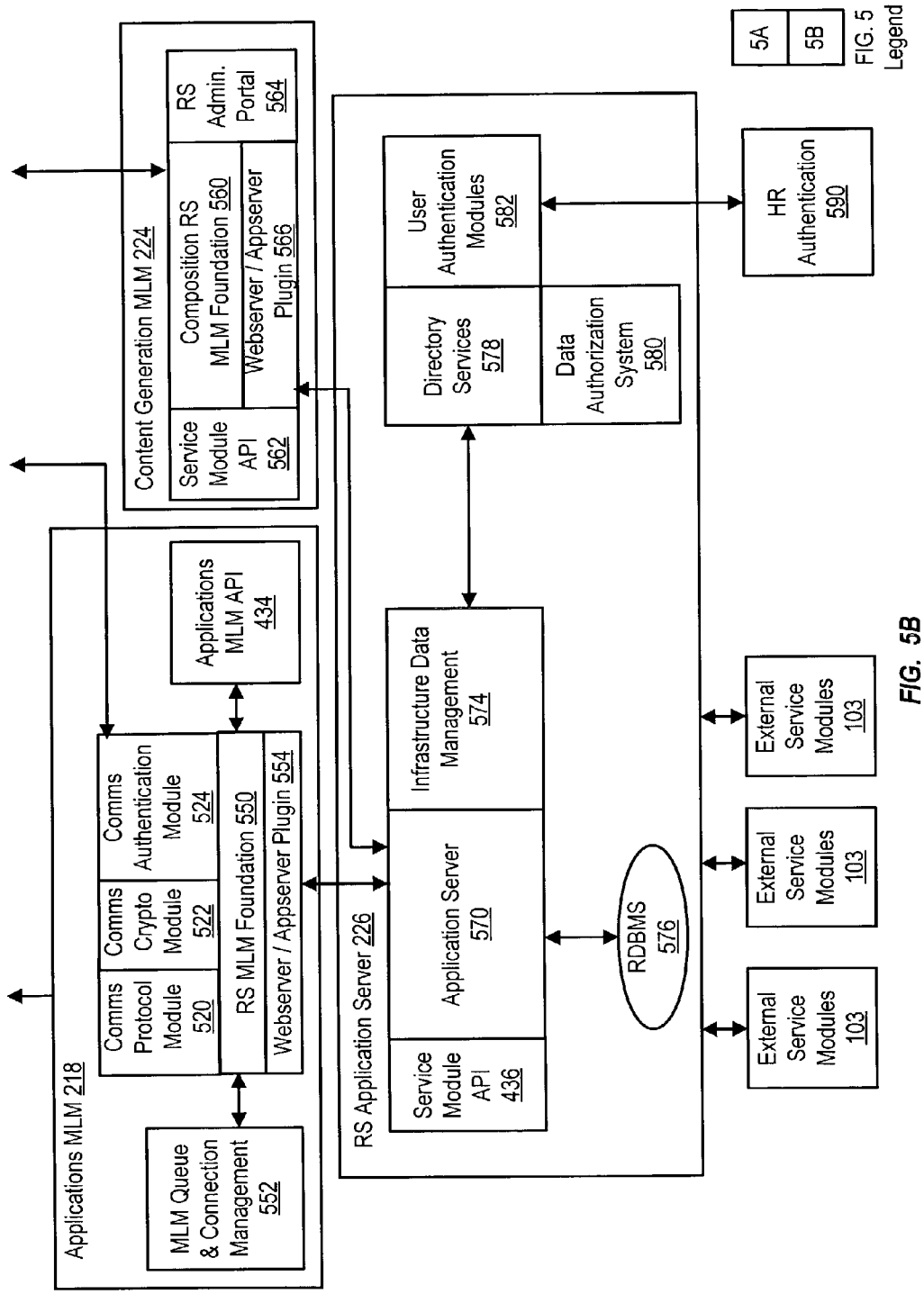

FIGS. 5A and 5B show a more detailed block diagram of the remote services architecture depicted in FIG. 2. Within this more detailed block diagram, the remote services communications modules 214 are shown distributed across the remote services proxy 210, the intermediate MLM 214 and the applications MLM 218.

The remote services proxy 210 includes a remote services proxy foundation module 510 which is coupled to a communications module 214 as well as to a remote services proxy integrator API module 430, a remote services proxy ID management module 514 and a remote services proxy queuing module 516.

The remote services system management integrator 212 includes a systems management API 418 and a remote services integrator 212. The remote services integrator 212 is coupled to the remote services proxy integrators API module 430 of the remote services proxy 210.

Each communication module 214 includes a communications protocol module 520 and a communications crypto module 522. A communications module 214 may also include a communications authentication module 524.

The intermediate MLM 216 includes an intermediate remote services MLM foundation module 540 which is coupled between communication modules 214. The intermediate remote services MLM foundation module 540 is also coupled to a MLM queue and connection management module 542 and an intermediate service module API module 432. Communications modules 214 couple the intermediate MLM 216 to the remote services proxy 210 and the applications MLM 218.

Bandwidth management system 222 controls bandwidth usage and data prioritization on the communications between intermediate MLM 216 and applications MLM 218. Certificate management system 220 is coupled between the communications authentication modules 524 for the intermediate MLM communications module 214 and the applications MLM 218 communications module 214.

The applications MLM 218 includes a remote services MLM foundation module 550 that is coupled to the communications module 214 for the applications MLM 218. The remote services MLM foundation module 550 is also coupled to an MLM queue and connection management module 552 and the applications MLM API module 434 as well as a web server application server plug-in module 554.

Content generation MLM 224 includes a composition MLM foundation module 560. The composition MLM foundation module 560 is coupled to a service content generation module API module 438 and a remote services administration portal 564 as well as a web server application server plug-in module 566.

Remote services application server 226 includes an application server module 570 coupled to an application server service module API 436 and an infrastructure data management module 574. The application server module 570 is also coupled to relational database management system (RDBMS) 576. The infrastructure data management module 574 is coupled to a directory services module 578. The directory services module 578 is coupled to a data authorization system module 580 and user authentication modules 582. The user authentication modules 582 are coupled to human resources (HR) authentication module 590. The remote services application server 226 is coupled to a plurality of external service modules 230.

FIGS. 6, 7, 8, 9 and 10 show expanded views of the remote services proxy 210 and remote services system management integrator 212, intermediate MLM 216, applications MLM 218, applications server 226 and content generation MLM 224, respectively.

Figure 6:
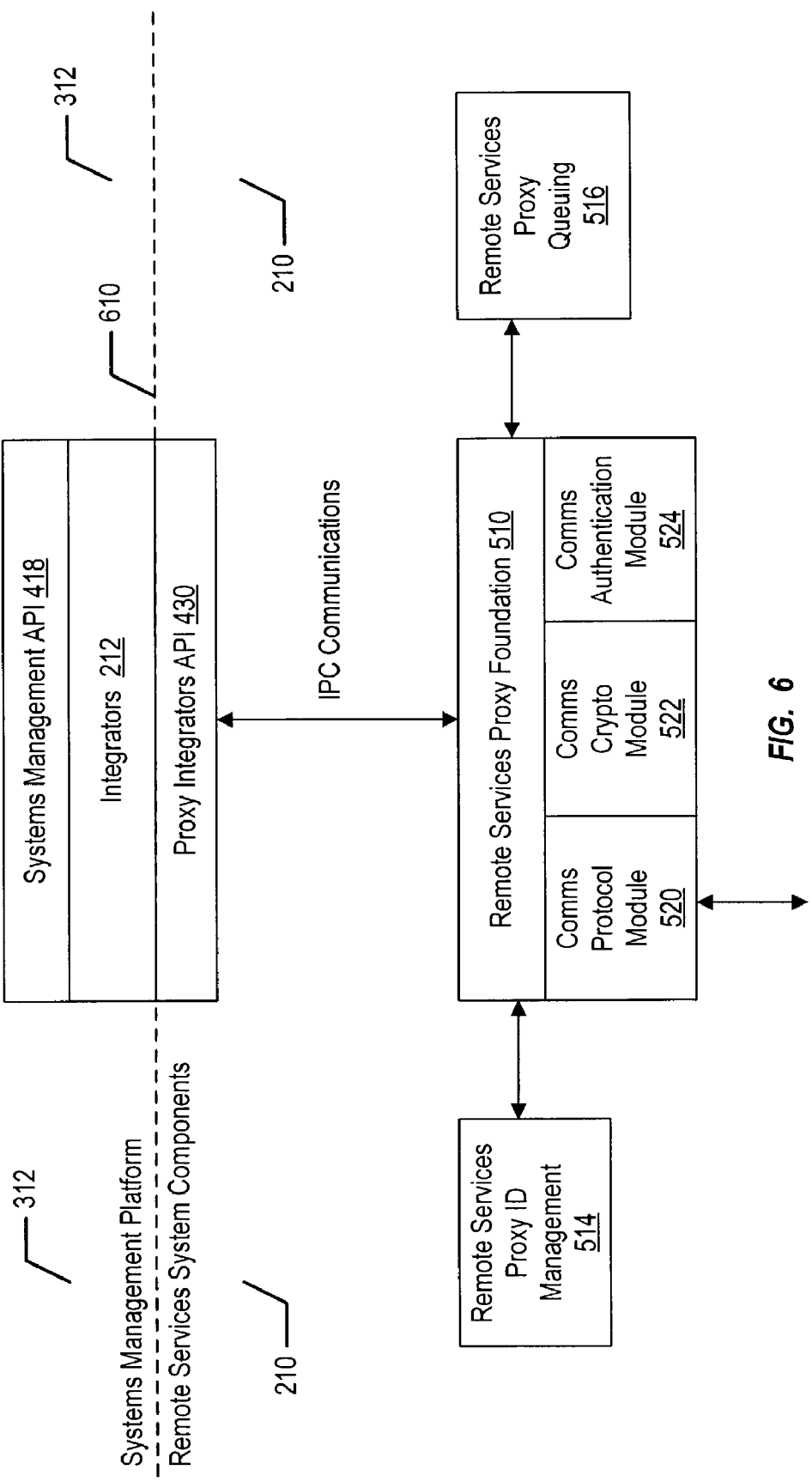
FIG. 6 shows a block diagram of a remote services proxy and a remote services system management integrator.

FIG. 6 shows a block diagram of the remote services proxy 210 and the remote services system management integrator 212. The block diagram shows the delineation between the systems management software and the remote services system components as indicated by line 610.

The remote services proxy 210 provides an API via remote services proxy integrators API 430 which communicates using the operating system's Inter-Process Communication (IPC) implementation with the remote services proxy foundation module 510. This communication allows the API to be implemented with a number of different languages to meet the needs of the systems management developers while leaving a single native implementation of the remote services proxy foundation module 510. Examples of the languages used for the API include Java and C++.

The remote services proxy foundation module 510, together with the API 430, manage data normalization tasks. This ensures that systems management data is carried independently through the system. For example, an event from one type of service, such as a SunMC service, would have the same structure as an event from another type of service, such as the RASAgent service. Accordingly, the service modules may deal with the data types that are specific to the respective service and are independent of their source.

In the remote services architecture, the integrator 212 and proxy 210 are represented by two separate processes (e.g., address spaces). By representing the integrator 212 and the proxy 210 as two separate processes, a faulty integrator 212 is prevented from taking down the whole proxy 210.

The remote services proxy queuing module 516 allows data to be queued for transmission when communications to the intermediate MLM(s) 216 become unavailable. This queuing is lightweight and efficient which in turn reduces the capabilities of length of time data can be queued and of reconnection management. The remote services proxy queuing module 516 provides a number of features that can be used to manage the queue, such as priority and time for data to live.

The remote services proxy ID management module 514 manages the allocation of unique identifiers for the proxy 210 itself and any support instances that are registered through the API. The remote services system 100 relies on the creation of unique ID's to manage individual support instances. This function is provided within the proxy 210 because there is no unique cross platform identifier available within the remote services system 100. The proxy 210 manages the mapping between the systems management ID (e.g., IP address) and the remote services ID, which is keyed off the unique customer ID provided at installation time within the deployed system.

Figure 7:
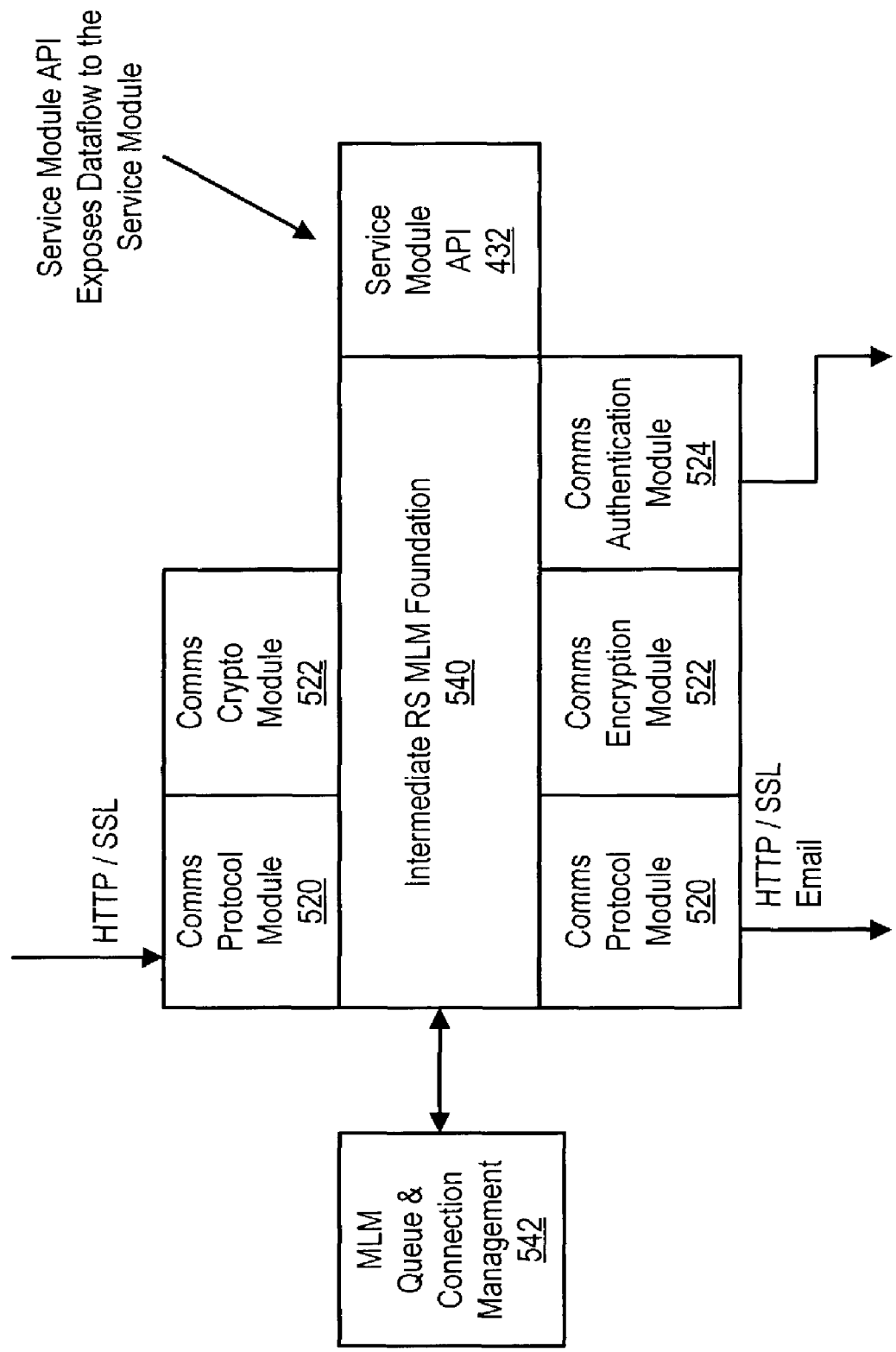
FIG. 7 shows a block diagram of a remote services intermediate mid level manager (MLM).

FIG. 7 shows a block diagram of the remote services intermediate MLM 216. The intermediate MLM may be a customer MLM or an aggregation MLM.

The customer MLM is an optional component that can be deployed to support scaling of both support instances and services as well as provide enhanced availability features for a deployed remote services environment. The intermediate MLM 216 receives information via the HTTP protocol from the remote services proxy 210. This information may optionally be encrypted. Connections are not authenticated by default on the server side, as it is assumed that the connection between the intermediate MLM 216 and the proxy 210 is secure.

The intermediate remote services MLM foundation module 540 exposes the data flow to the service module API 432 where registered service modules can listen for new data of specific types and mutate the data as required. Examples of this function include filtering of certain types of data or data aggregation. The customer MLM does not keep state from an infrastructure perspective. However, the service module could choose to keep persistent state information. The recoverability fail-over support of that state, however, is in the domain of the service module, although the basic session replication features that provide the redundancy features of the infrastructure data flow may be reused.

The queue and connection management module 542 provides a highly reliable secure connection across the wide area network to the service provider based MLM farms. The queue manager portion of module 542 also manages back-channel data that may be intended for specific remote services proxies as well as for the applications MLM 218 itself.

The intermediate remote services MLM foundation module 540 manages the rest of the MLM's roles such as session management, fail-over management and shared queuing for the back-channel.

Aggregation MLM's, while provided by the service provider, function much the same as customer MLM's. Strong security is turned on by default between such MLM's and the remote services proxy 210. Accordingly, a communications authentication module 524 is used on the receiving portion of the intermediate MLM 216.

Figure 8:
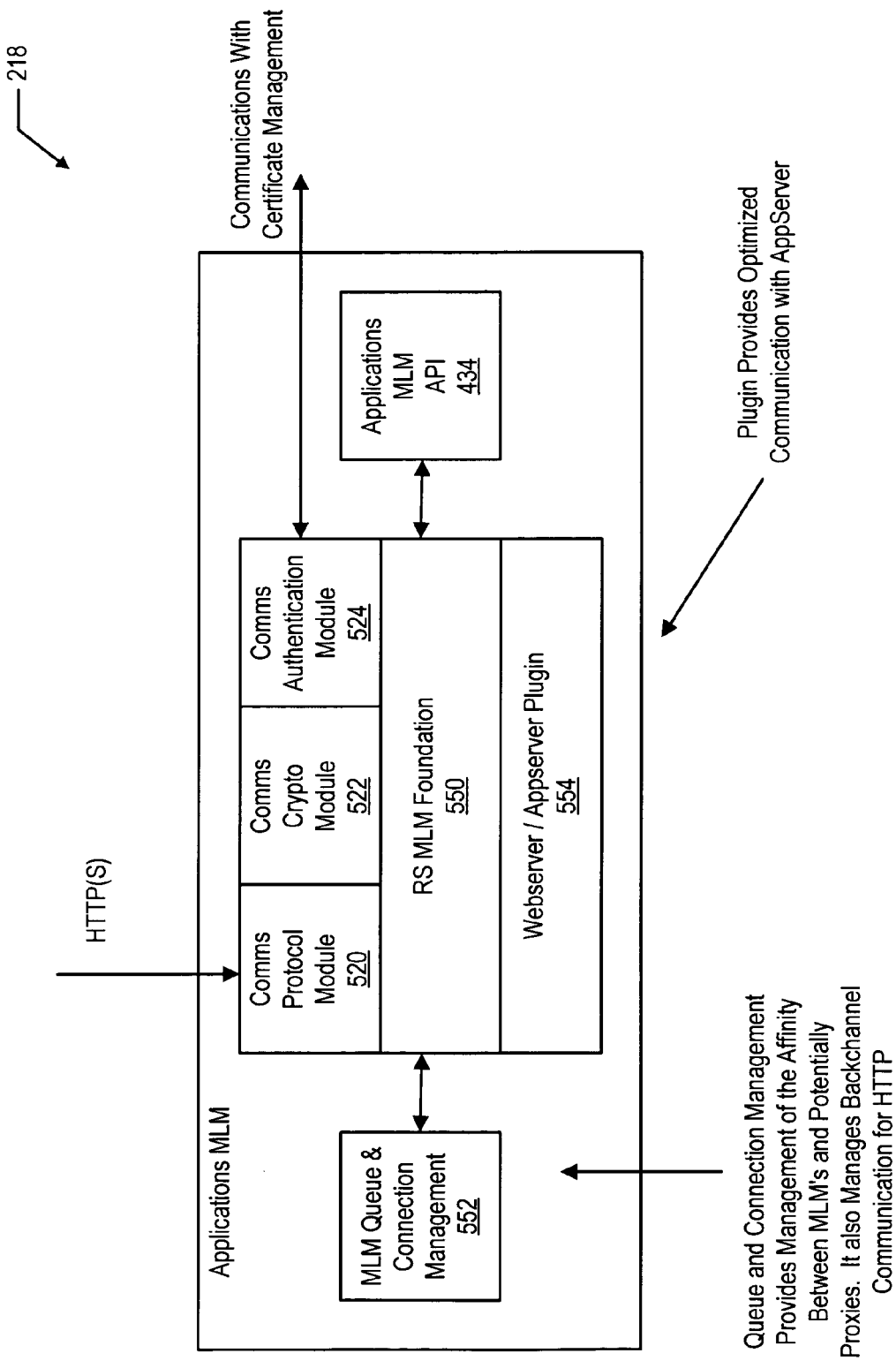
FIG. 8 shows a block diagram of a remote services applications MLM.

Referring to FIG. 8, the remote services application MLM 218 provides several functions (applications) for the remote services system 100. The remote services application 218 hosts applications as well as functioning as a content creation MLM. The host applications within the application MLM 218 include data normalization, customer queue management and remote access proxy. The data normalization application supports normalization and formatting of data being sent to the application server 226. The customer queue management application handles general connections to and from customer remote services deployments. The customer queue management application also manages back-channel requests and incoming request. The remote access proxy application provides a remote access point as well as functioning as a shared shell rendezvous point. The applications MLM 218 uses the application server plug-in to communicate directly with the application server 226.

The communications authentication module 524 communicates with the certification management system 220 to validate incoming connections from customers. Each customer is provided a certificate by default although more granular allocations are available. Certificates are distributed at installation time as part of the installation package for both the remoter services proxy module and for the remoter services customer MLM.

Figure 9:
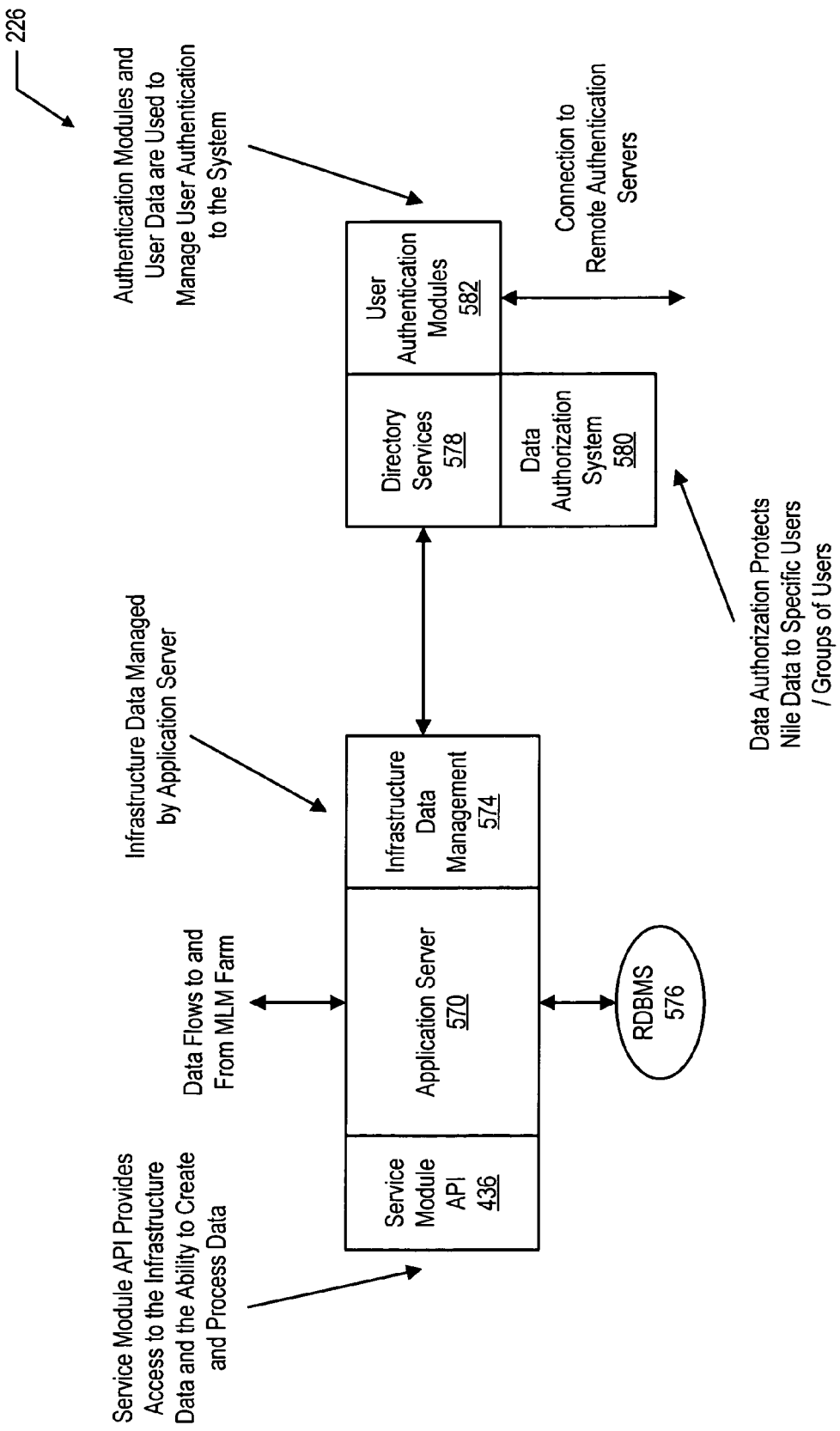
FIG. 9 shows a block diagram of an application server module.

Referring to FIG. 9, the application server 226 manages the persistence and data processing of the remote services infrastructure 102 and the service modules 103.

The application server 226 provides the core service module API 436 to the service module creator. The service module API 436 is based upon the J2EE API. The service module API 436 allows the service module creator to register for certain types of data as the data arrives and is instantiated. This data can then be processed using the support of the application server 226 or alternatively exported from the remote services system 100 for external processing.

The infrastructure data is held within the application server 226 and stored within the RDBMS 576 associated with the application server 226. Access to this data is available via the service module API 436 and is managed via the infrastructure data management module 574.

The directory services implementation supports user authentication, data authorization and private network data support. User authentication uses a pluggable authentication module (PAM) so support a plurality of authentication methods such as a lightweight directory assistance protocol (LDAP) method for service provider employees and a local login method for a remote services based login schema. Other methods may be added. The LDAP login is processed using a replicated copy of an LDAP server running within the remote services infrastructure 102.

Data authorization is designed to protect the data held within the application server 226 to specific groups of users. This protection allows customers to grant or deny access to their service data to specific users. This data protection is managed down to the service module granularity. So for example, a customer could grant information about advanced monitoring on a subset of their support instances to members of a service provider monitoring staff.

Figure 10:
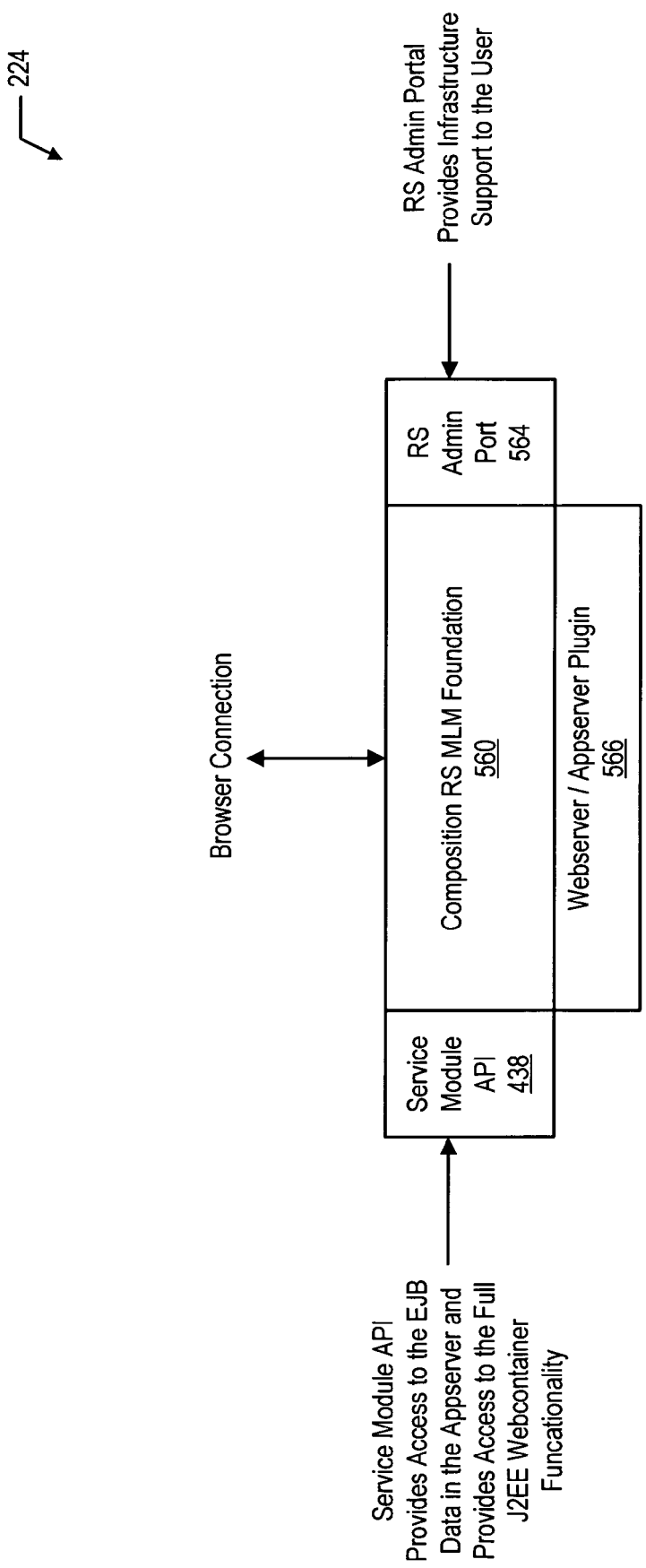
FIG. 10 shows a block diagram of a content generation MLM module.

Referring to FIG. 10, the remote services content generation MLM 224 provides HTML generation bases on the data held within the application server 226. The content generation MLM 224 provides a service module API 438 for service module creators to develop content composition for their data which is processed by the application server 226. The content is in the form of J2EE web container which supports Java servlets and Java servlet pages (JSP) API's.

The content generation MLM 224 communicates with the application server 226 using the same Netscape API (NSAPI) plug-in as the remote services applications MLM 218. Instances of these two MLMs make up an MLM farm. The composition remote services foundation layer provides support for caching of HTML pages and associated data to reduce the data request hit back to the application server 226.

The remote services administration portal 564 provides control of the deployed customer infrastructure to the customer and control over the total infrastructure to trusted users.

Figure 11:
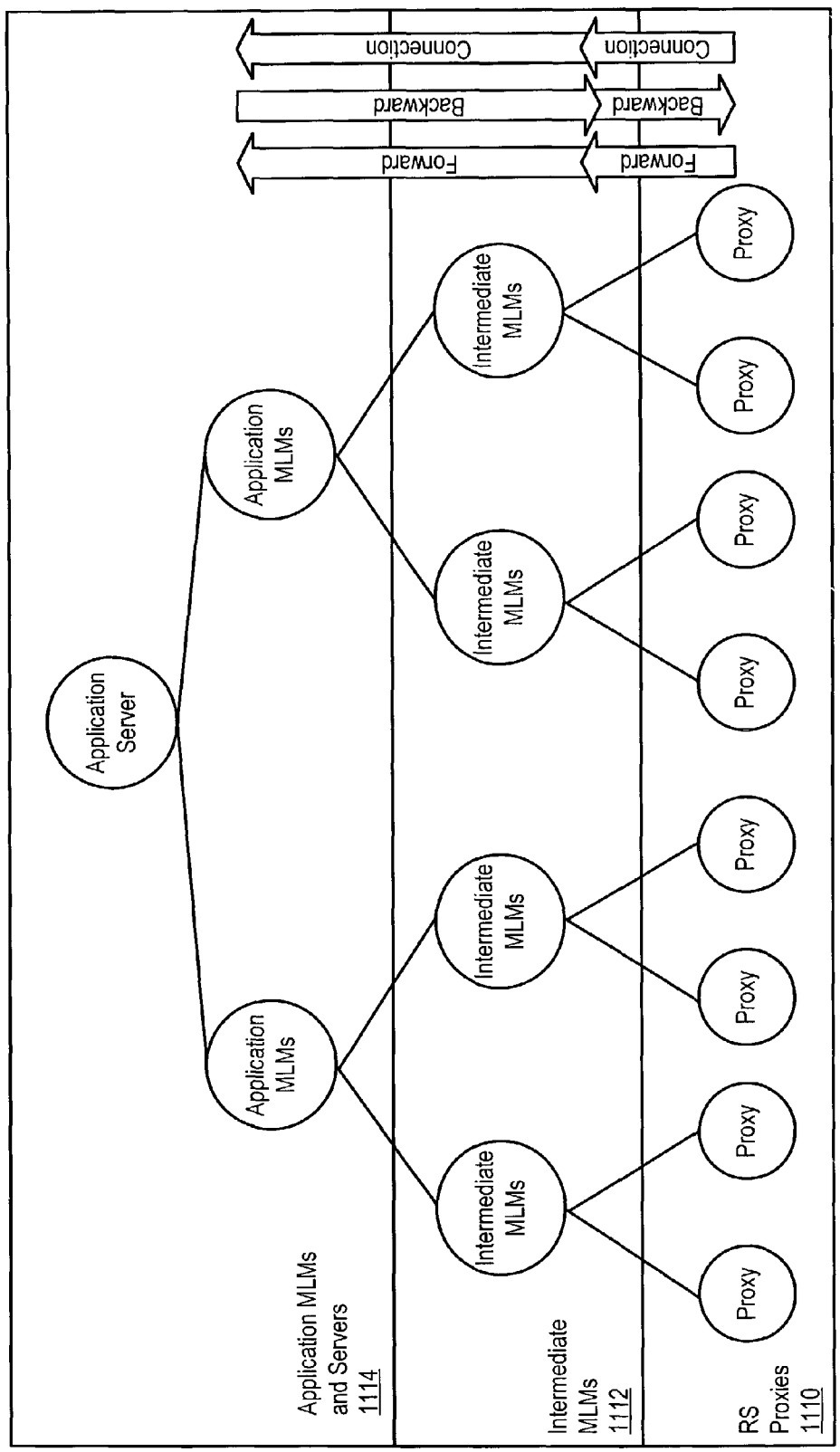
FIG. 11 shows a flow diagram of a remote services system communication.

FIG. 11 shows a flow diagram of communications within a remote services architecture. In one embodiment, the communications between a customer and a service provider is via a wide area network (WAN). Communications within the remote service architecture includes three tiers, a remote services proxy tier 1110, an intermediate MLM tier 1112 and an application MLM and server tier 1114. Communication is established and connections are made from the bottom tier (the remote services proxy tier) to the top tier.

The remote services architecture supports two application protocols for the majority of its services classification support: HTTP and Email messaging. There are a plurality of service module classifications that each have specific communications protocol relationships. More specifically, the service module classifications include a data collection classification, a monitoring classification, a remote access classification and an infrastructure administration classification.

With the data collection classification, the connection orientation is message based, the physical connection support may be Internet, private network or fax, and the protocols supported may be Email or HTTP. Examples of service modules of this classification include an inventory management service module and a performance management service module.

With the monitoring classification, the connection orientation is message based, the physical connection support may be Internet, private network or fax, and the protocols supported may be Email or HTTP. Examples of service modules of this classification include basic self service monitoring and full hardware monitoring with service action.

With the remote access classification, the connection orientation is session based, the physical connection support may be Internet, private network or fax, and the protocol supported is HTTP. The session based connection orientation is one way initiation from the customer. Examples of service modules of this classification include remote dial in analysis and remote core file analysis.

With the infrastructure administration classification, the connection orientation is session based or off-line installation, the physical connection support may be Internet, private network or fax, and the protocol supported includes HTTP, email or physical (e.g., telephone or CD). The session based connection orientation is one way initiation from the customer and the off-line installation is via, e.g., a CD. Examples of service modules of this classification include remote services administration, installation, updates, configuration and notification.

Encryption options are related to the protocol. A secure socket layer (SSL) protocol, for example, is likely to be the chosen protocol for an HTTP transmission, i.e., an HTTPS transmission. The remote services communication architecture does not enforce this however. So, for example, data could be sent by encrypting the body of an HTTP stream. This provides an advantage when a customer's HTTPS proxy infrastructure is not as resilient as their HTTP proxy infrastructure.

Email uses an email encryption option such as s-mime or encrypting the body using a third party encryption method such as PGP. Encryption is optional at all stages. If the customer does not require encryption, then encryption need not be used.

Authentication of the remote services communication is standard for all protocols. Accordingly, the service provider may validate the sender of data and the customer may validate that the service provider is the receiver. Authentication is managed via certificates.

Certificates are used in both the client and server to authenticate a communications session. Client certificates are generated during the customer registration process and are built into the remote services proxy and the customer MLM. By default, each customer is provided a client certificate. The customer can, however, define specific security groups within their service domain and request additional client certificates for those domains. Remote services processes include a certificate distribution mechanism, supporting either the creation of a new security group within an existing customer or the redeployment of a new certificate after a certificate is compromised.

Figure 12:
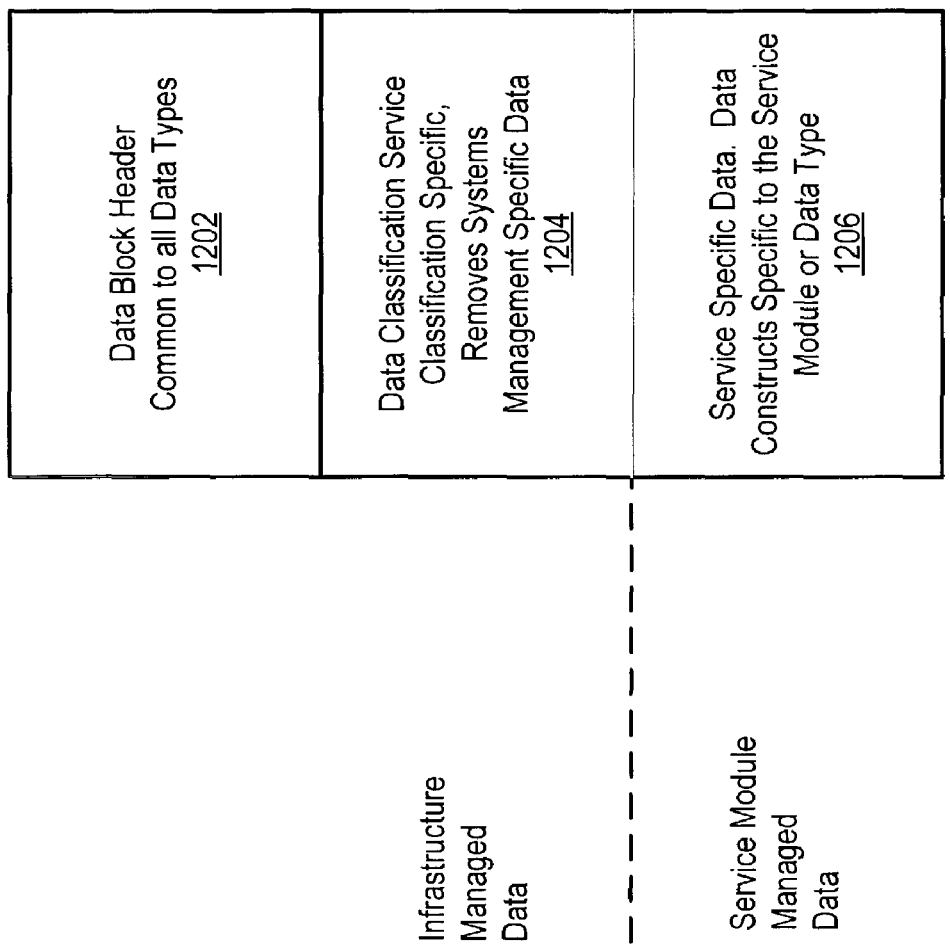
FIG. 12 shows a block diagram of the data blocks that comprise the data that flows through the remote services infrastructure.

FIG. 12 shows a block diagram of the data blocks that comprise the data that flows through the remote services infrastructure. Each system management system conforms to the data definitions that are part of the remote services proxy integrators API 430. The remote services communications architecture provides a normalized view of the data, regardless of in which systems management framework the data originated.

Data block header 1202 is common to all data types. Data block header 1202 contains items such as source, routing information, time to transmit and source type. Data block header 1202 is used to route the data correctly through the remote services system 100 to the correct service module 103. Data block header 1202 is used to provide diagnostic and quality of service measurement built into the system.

Infrastructure data block 1204 provides data classification service classification specific data. Infrastructure data block 1204 removes systems management specific data.

Service module data block 1206 provides format based on each service classification that drives the system the systems management normalization of the data that flows through the system. For example, alarm data includes general characteristics defined such as severity, state and originating support instance.

Figure 13A:
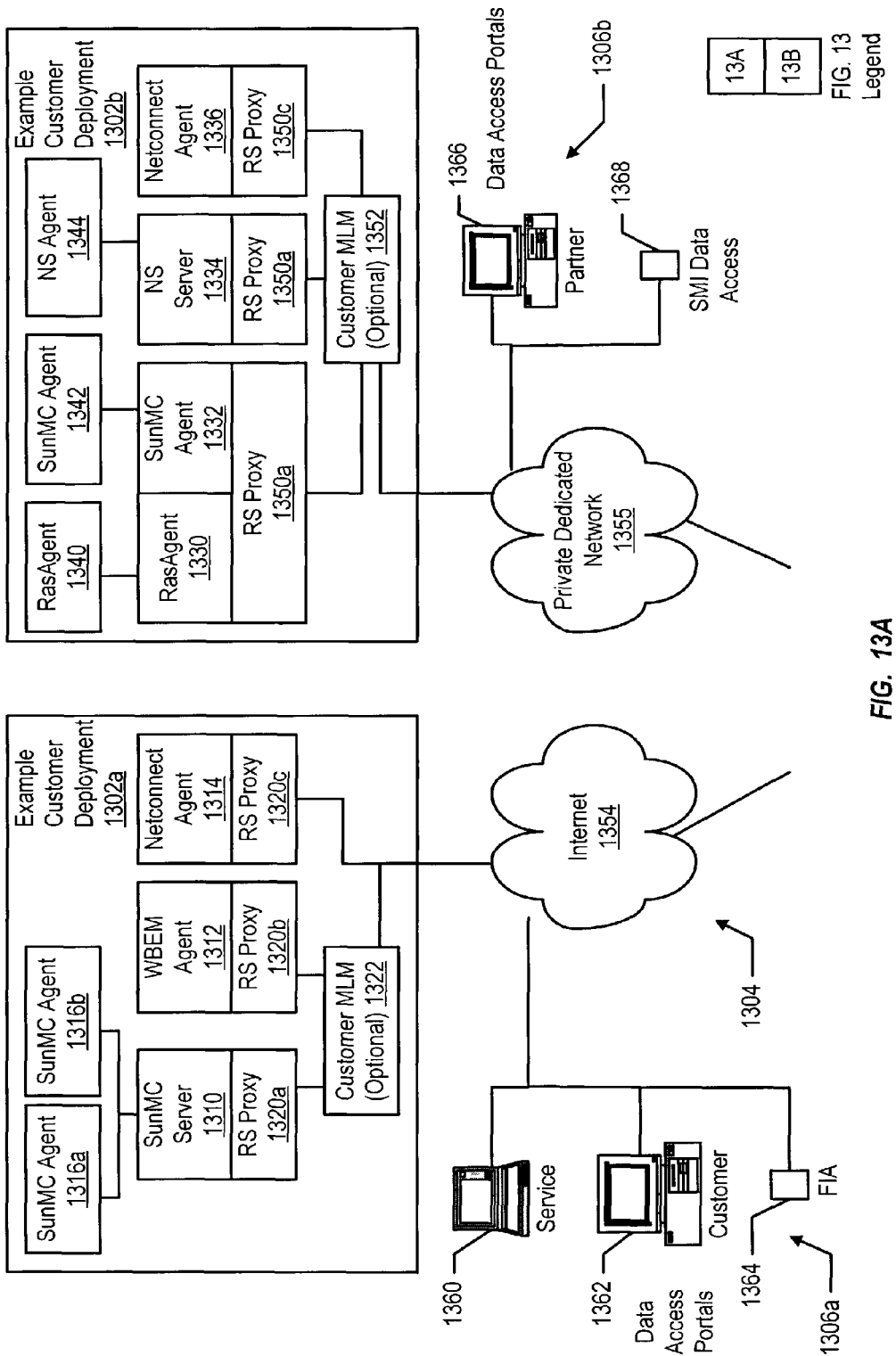
FIGS. 13A and 13B show an example of the high level architecture component relationships of a remote services system that is configured according to the remote services architecture.
Figure 13B:
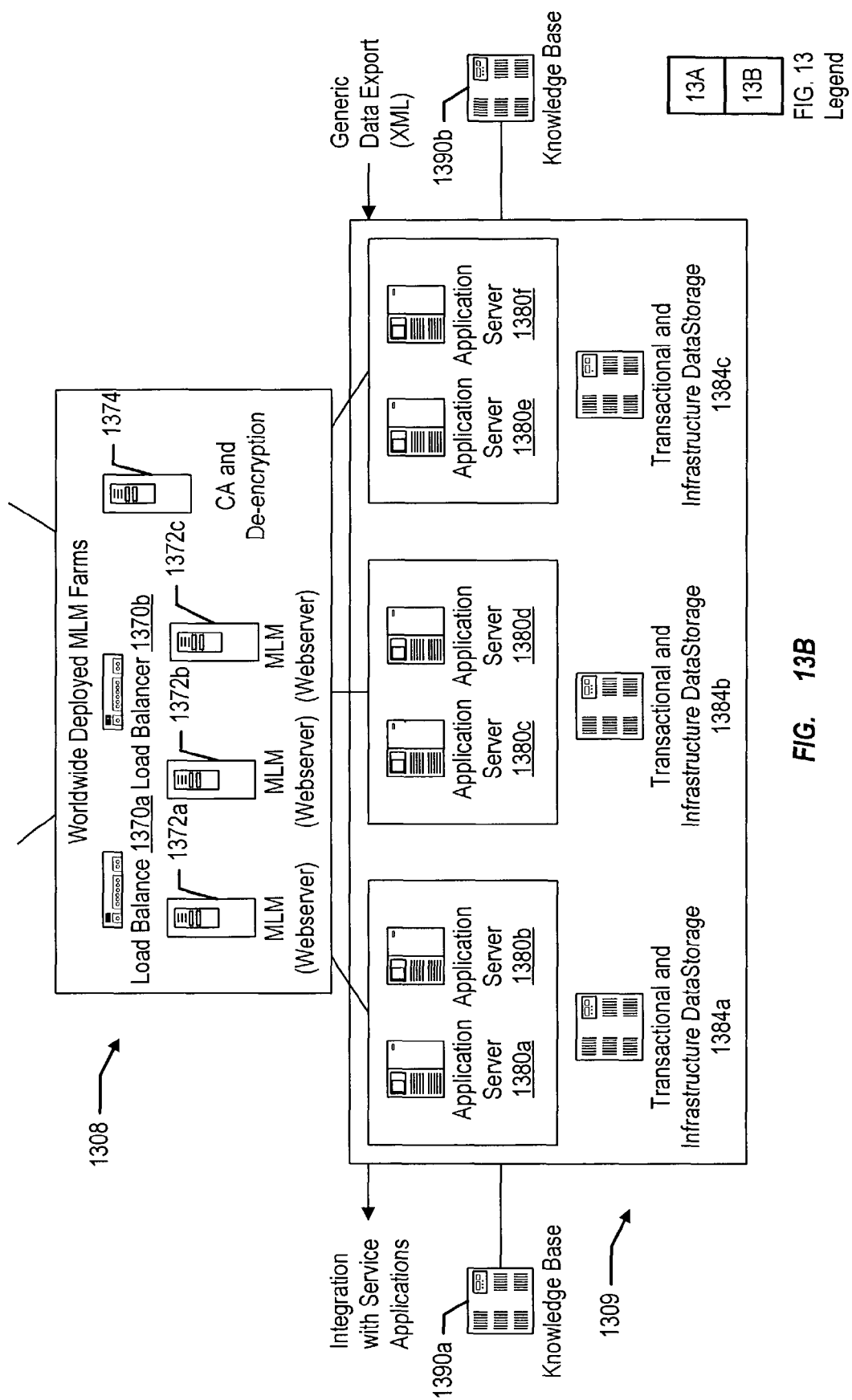

FIGS. 13A and 13B show an example of the component relationships of a remote services system 100 that is configured according to the remote services architecture. Various components of the remote services system 100 execute modules of the remote services infrastructure architecture 205. Remote services system 100 includes customer deployment portion 1302a, 1302b, network portion 1304, data access portal 1306a, 1306b, Mid Level Manager (MLM) portion 1308, and application server portion 309.

Customer deployment portion 1302a sets forth an example customer deployment. More specifically, customer deployment portion 1302a includes SunMC server 1310, WBEM agent 1312, and Netconnect Agent 1314. SunMC agents 1316a, 1316b are coupled to SunMC server 1310. Server 1310, Agent 1312 and Agent 1314 are each coupled to a respective remote services proxy 1320a, 1320b, 1320c. Remote services proxies 1320a, 1320b, 1320c are coupled to network portion 1304, either directly, as shown with proxy 1320c, or via customer MLM 1322, as shown with proxies 1320a and 1320b. Proxies 1320a and 1320b may also be directly coupled to network portion 304 without the MLM 1322 present. The SunMC server is a provider specific systems management server (i.e., health management server). The SunMC agents are provider specific systems management agents (i.e., health management agents). The WEBM agent is a web based enterprise management agent. The Netconnect agent is a basic collection agent. Customer deployment portion 1302a illustrates that the systems management may be 2-tier (e.g., agent, console) or 3-tier (e.g., agent, server, console).

Customer deployment portion 1302b sets forth another example customer deployment. More specifically, customer deployment portion 1302b includes RasAgent 1330, SunMC agent 1332, NS server 1334 and Netconnect Agent 1336. RasAgent 1340 is coupled to RasAgent 1330. SunMC Agent 1342 is coupled to SunMC Agent 1332. NSAgent 1344 is coupled to Netconnect Agent 1336. RasAgent 1330 and SunMC Agent 1332 are coupled to remote services proxy 1350a. Metropolis Server 1334 is coupled to remote service proxy 1350b. Netconnect Agent 1336 is coupled to remote services proxy 1350c. Remote services proxies 1350a, 1350b, 1350c are coupled to network portion 1304 either via customer MLM 1352 or directly. The RasAgent is a reliability, availability, serviceability agent. The NSagent is a network storage agent and the NS server is a network storage server. Both the NSagent and the NS server are reliability, availability, serviceability type devices.

Network portion 1304 includes at least one interconnection network such as the Internet 1354 and/or a private dedicated network 1355. Internet 1354 is assumed to be an existing connection that is reused by the remote services system. The private dedicated network 1355 is a dedicated link that is used exclusively by the remote services system to connect the customer to the service provider. The data to manage the private network is provided by directory services technology held within the application server portion 1308. The directory services technology handles all of the domain name service (DNS) services used to manage name to allocated internet protocol (IP) information. The remote services infrastructure also offers transmission over fax from the customer's environment (not shown). The fax communication is for service modules where the fax transmission makes sense. For example, fax transmission may be used in a military site which does not allow electronic information to be transmitted from it.

Data access portal portions 1306a and 1306b provide access to the remote services system 100. More specifically, data access portal portion 1306a includes a service access portion 1360, a customer access portion 1362 and a field information appliance (FIA) 1364. Data access portal portion 1306b includes a partner access portion 1366 and a system management interface (SMI) data access portion 1368.

Mid level manager portion 1308 includes load balancers 1370a, 1370b, MLM webservers 1372a, 1372b, 1372c and communication authentication (CA) and de-encryption server 1374.

Application server portion 1309 includes a plurality of application servers 1380a-1380f. Application servers 1380a, 1380b are associated with transactional and infrastructure data storage 1384a. Application servers 1380c, 1380d are associated with transactional and infrastructure data storage 1384b. Application servers 1380e, 1380f are associated with transactional and infrastructure data storage 1384c. Application server portion 1309 also includes knowledge base 1390a, 1390b. Application server portion 1309 integrates with service applications as well as via generic data export (such as, e.g., XML).

Remote services proxies 1320, 1350 provide a System Management Integrators API. Using this API, system management products can integrate their customized handling of data into the common data format that is used by the remote services architecture. Accordingly, the system management component of the overall system is effectively segmented away from the remote services architecture.

Additionally, by using the remote services proxies 1320, 1350, the remote services architecture leverages much of a pre-existing instrumentation and data collection mechanisms that already exist. Accordingly, already deployed instrumentation agents within a remote service provider existing system such as those from SunMC and Netconnect may be integrated into a remote services system. Additionally, third party systems management systems may also be supported and integrated via the remote services proxies.

Customer deployment portions 1302a, 1302b each show an optional customer MLM component deployed to the customers environment. Whether to deploy the customer MLM component depends on a number of factors. More specifically, one factor is the number of support instances installed in the customer's environment and the number of services being utilized by the customer. A deployed MLM component can allow greater scale capabilities. Another factor is the type of services deployed within the customer environment. Some services are optimized when an MLM component is deployed to the customer environment to support service specific tasks such as filtering and data aggregation. Another factor is the quality of service. Deploying an MLM component provides a greater level of quality of service because the MLM component provides enhanced data communications technology within the MLM infrastructure modules.

The decision of whether to deploy a remote services MLM component (or more) to the customer's environment is a deployment decision. There are a number of architecture deployment classes which are used to meet the varying customer needs.

The remote services system communicates via two main protocols, HTTP and email. Security considerations for these protocols can be chosen by the customer and plugged into the system. For example, the HTTP protocol may use SSL. Additionally, the email protocol may use some well known form of encryption.

The connections from the customer deployment portion 1302 feed into MLM farms which reside within the SMI service provide environment. These MLM farms are sets of redundant web servers 1372 that are balanced using conventional load balancing technologies. Alongside these web servers 1372 are infrastructure servers 1374 which provide specific infrastructure acceleration for decryption and distribution of certificates for communications authentication.

These MLM farms provide a plurality of functions. The MLM server farms provide remote proxy connections. In deployments when an MLM is not deployed to the customer, the customer's proxy connects to the MLM farms within MLM portion 1308. Also, in deployments when a customer MLM 1322, 1372 is present, the MLM farm communicates and manages communication with the deployed customer MLM 1322, 1372. Also, the MLM server farms provide data processing capabilities, e.g., the MLM farms provide application specific tasks to prepare data for passing to the remote services application server portion 1309. Also, the MLM server farms provide access points for the customer and service personnel via browser like connections. The MLM farm generates the HTML that is presented to the browser.

The MLM technology is based upon known web server technology such as that available from Sun Microsystems under the trade designation iPlanet. Plug-in functionality is provided by the servlet and JSP interfaces available as part of the web server technology.

The remote services application servers 1380 provide data processing and storage for the remote services infrastructure as well as for any hosted service modules. The remote services application servers 1380 are based upon known application server technology such as that available from Sun Microsystems under the trade designation iPlanet application server 6.0. The remote services application server 1380 provides support for horizontal scalability, redundancy and load balancing. Thus providing the back-end components of the remote services architecture with a high level of built in assurance and flexibility. Application partitioning of the application servers 1380 provides processing distribution to ensure that heavy processing that may be required by more complex services are handled appropriately without affecting the remainder of the remote services architecture.

Application server portion 1309 provides integration into existing business systems, generic data export and tight integration with existing knowledge base implementations 1390. Data export is handled through structured XML, data can be exported asynchronously by a client registering to receive data of a particular type or synchronously by the application server 1380 accepting a request from a client.

The core service module API is provided by the application server 1380 using a J2EE implement API. The basic container services of J2EE are extended to provide remote services specific functions and to create the basis of the API. Accordingly, a service module creator can rely on a number of provided for services, such as database persistency, high levels of atomic, consistent, isolated, and durable (ACID) properties, directory service access, authorization protection for the data and access to the data collected by the remote services infrastructure itself.

The creation of a service module, which provides the technology to support a specific remote service, involves at least one of the following components: a creation of detection/collection logic component; a mid-stream analysis and management of data component; an analysis and storage of data component; and, a presentation and management of the data/knowledge component.

The detection/collection logic is created within the domain of a systems management toolkit. The mid-stream analysis and management of data is an optional step and effectively provides analysis of the data within the customer's environment. Inclusion of this logic would mean that the mid-stream analysis and management of data service module would have a remote services MLM deployed to the customer's environment 1302a, 1302b. The deployment of the remote services MLM to the customer's environment reduces and manages the data being sent over the WAN to the remote services provider. The analysis and storage of data component is performed within the application servers domain (the component may be exported). This analysis and storage of data component turns data into knowledge and service value that can then be presented back to the customer. The presentation and management of the data/knowledge component is where the data and knowledge that is developed from the analysis and storage of data component is presented to the customer or service personnel. The presentation and management of data/knowledge component may include interactive support to provide modification of the data values.

Figure 14:
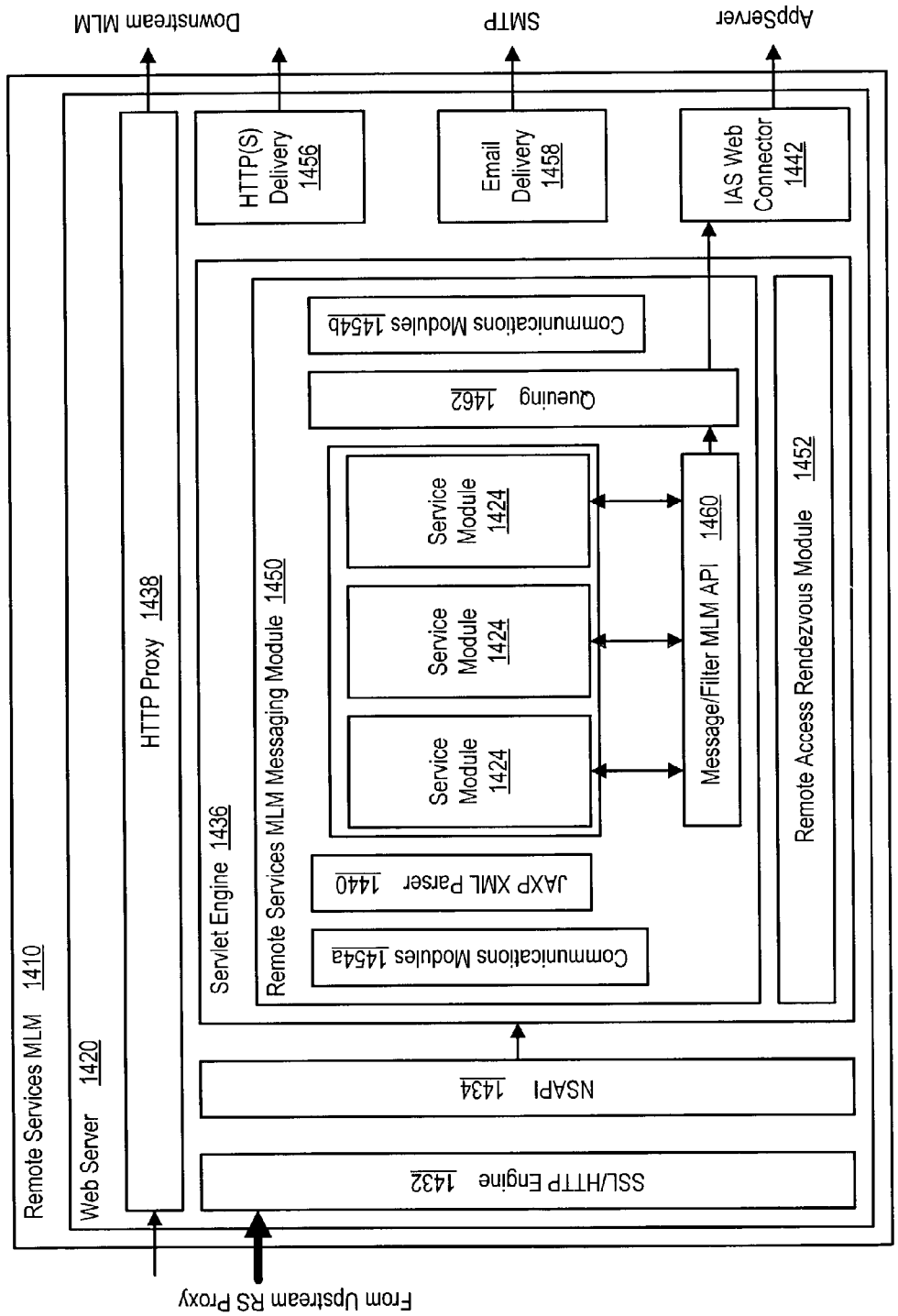
FIG. 14 shows a schematic block diagram of a generic mid level manager.

Referring to FIG. 14, a schematic block diagram of a generic remote services mid level manager (MLM) is shown. The remote services MLM 1410 is a middleware component that manages communications within the remote services system 100. Within the remote services system 100, at a minimum two MLMs are present, an intermediate MLM 216 and a remote services applications MLM 218. Additionally, MLMs running substantially identical services (and located logically at the same point on the path) may be scaled horizontally. The actual number of MLMs used varies depending on the requirements for scalability, network bandwidth, communications auditing, security and quality of service. The MLMs may be classified based upon their location on the communication path and the services that each MLM provides.

The mid level manager is a flexible component that is used at several different points on the communications path between the remote services proxy hosts and the remote services application server 226.

The mid level manager provides a plurality of functions including a communication gateway function, a data filtering and aggregation function, a data normalization function, a gateway to the remote services application server function and a content creation function.

The communication gateway function includes concentrating multiple remote services proxy data streams into a single data stream, bulk data transfer gateway and back-channel routing, queuing and delivery. The communication gateway function improves network bandwidth utilization and simplifies the configuration when a firewall or HTTP proxy server is being used.

The data filtering and aggregation function enables the mid level manager to be configured to discard messages (e.g., events) or, in some specific cases, to aggregate messages. Network bandwidth is optimized by discarding uninteresting messages and customer confidence is improved by blocking the sending of sensitive data to the remote services provider.

The data normalization function enables the MLM to normalize data gathered by the remote services proxy devices into standard forms for communication with the remote services application server 226. This function allows the remote services proxy 210 to be lighter and simpler.

The gateway to the remote services application server function is provided in the final downstream MLM that communicates directly with the applications server, e.g., the applications MLM 218. This function feeds the remote services application server 226 with data received from upstream remote services components and processes the data if needed by the application server 226.

The content creation function is provided in the final downstream MLM that communicates directly with the applications server 226. The content creation function formats service data for presentation to end users. This function, thus changes the traditional tightly coupled relationship between an applications server and its web server. This function allows the application servers 226 to scale based on the volume of server data, while the mid level managers scale based on the communications load.

The mid level manager 1410 includes three sections, a Web server components section 1420, an MLM infrastructure components section 1422, and a service modules section 1424. The Web server components section 1420 provides common web application services. The MLM infrastructure components section 1422 implements the core services of the MLM 1410. The service modules section 1424 provides the data processing for the MLM 1410.

The Web server components section 1420 includes an HTTP engine 1432, a NetScape API (NSAPI) engine 1434, a servlet engine 1436, an HTTP proxy 1438, a Java XML parser (JAXP) 1440 and an iAS Web connector 1442. The HTTP engine 1432 provides the basic HTTP server side protocol support, including connection scheduling and security (SSL). The NSAPI engine 1434 includes a Netscape server API engine which provides a native API into the Web server for implementing web applications. The NSAPI engine offers higher performance than a servlet or CGI interface, but is not as portable. The servlet engine 1436 provides an API for writing portable web applications. The servlet engine 1436 is preferably a Java servlet engine. The JAXP Java XML parser 1440 is a standard J2EE XML parsing service. The iAS Web connector 1442 provides a high speed load balanced communications between a web server and an applications server.

The MLM infrastructure components section 1422 includes an MLM messaging module 1450 and a remote access rendezvous module 1452. The MLM infrastructure components section 1422 also includes communications modules 1454a, 1454b and delivery agents 1456, 1458. The MLM messaging module 1450 further includes a Message filter module 1460, an aggregation queue module 1462 and a services container 1464.

The MLM messaging module 1450 supports reliable, ordered transfer of short messages between a remote services proxy 210 and the applications server 226. The messaging module 1450 provides an extensibility mechanism, called the remote services container that allows remote service modules to be loaded and run in the MLM. The container provides all the remote service modules with a consistent interface to the MLM infrastructure features. A message filter allows specific messages to be forwarded to the next MLM, discarded, or diverted to one or more remote service modules 103.

The remote access module 1452 supports request for fully synchronous bidirectional session between a remote services proxy 210 and the applications server 226. The remote access module is used to get authorization and the access parameters to remote access rendezvous servers. Once established, the remote access module 1452 supports interactive services such as remote console login (telnet). The session is first set up with an exchange of short messages between the remote services proxy 210 and the application server 226 via the messaging module 1450. The interactive session may use the HTTP proxy of the MLM to relay the connection to the remote services rendezvous server after authorization.

The communications modules 1454a, 1454b and delivery agents 1456, 1458 encapsulate short messages into XML and send the messages to the next MLM (via HTTP or Email). Alternately, the communications modules 1454a, 1454b and delivery agents 1456, 1458 send messages to the applications server 226. In addition to the delivery agent 1458, when supporting Email delivery of service data, an Email server channel program such as the iPlanet Email server channel program, is used to take delivery of encapsulated short messages and forward those messages into an MLM via the HTTP delivery agent 1458.

The message filter module 1460 is a configurable component that examines the message class, subclass and other message attributes to determine whether to discard the message, forward the message on to a downstream MLM or applications server 226 or to route the message through a service module 103. The service module 103 would then have the option of discarding the message or rewriting the message and then returning the message to the message filter module 1460. All messages received by the MLM 1410 are passed through the message filter module 1460.

When processing a message, all service modules 103 have the option of aggregating the message. The aggregation queue 1462 uses a shared queue to store messages waiting to be aggregated. The queue is shared between all MLMs that are part of the same MLM farm. Heartbeat aggregation is an example of a service module 103 using aggregation.

The service container 1464 is a J2EE type container in which all MLM applications (i.e., service modules 103) are run.

The service modules section 1424 includes a plurality of service modules 1470 that run within the remote service container 1464. The service modules 1470 perform functions such as processing service specific data, making that data available remotely and adding customer value. Most service modules 103 are written by product development teams to integrate a particular management application or service tool into the remote services system 100. However, a basic set of service modules, referred to as foundation services, are implemented as part of the basic remote services system 100.

Additionally, a host system that is running the MLM 1450 may also have its own remote services proxy 210 that gathers service data for the host system. The remote services proxy 210 for the MLM may report to the local MLM or report to a downstream MLM in order to communicate availability data in the event of an MLM fault.

Mid level manager 1410 represents a super set of the components used in each specific mid level manager. For example, a customer MLM does not use the iAS Web connector to communicate with the remote services application server 226. However, the applications MLM 218 would use the iAS Web connector. Alternately, the HTTP Proxy is included only within the intermediate MLM 216, not on the applications MLM 218.

Additionally, the mid level manager 1410 shown in FIG. 14 does not show the handling of back-channel information. Back-channeling is used during session mode communication. Files and short messages are sent down the back-channel for processing either locally by the MLM or for forwarding to the remote service proxy 210 upon its next connection.

Figure 15:
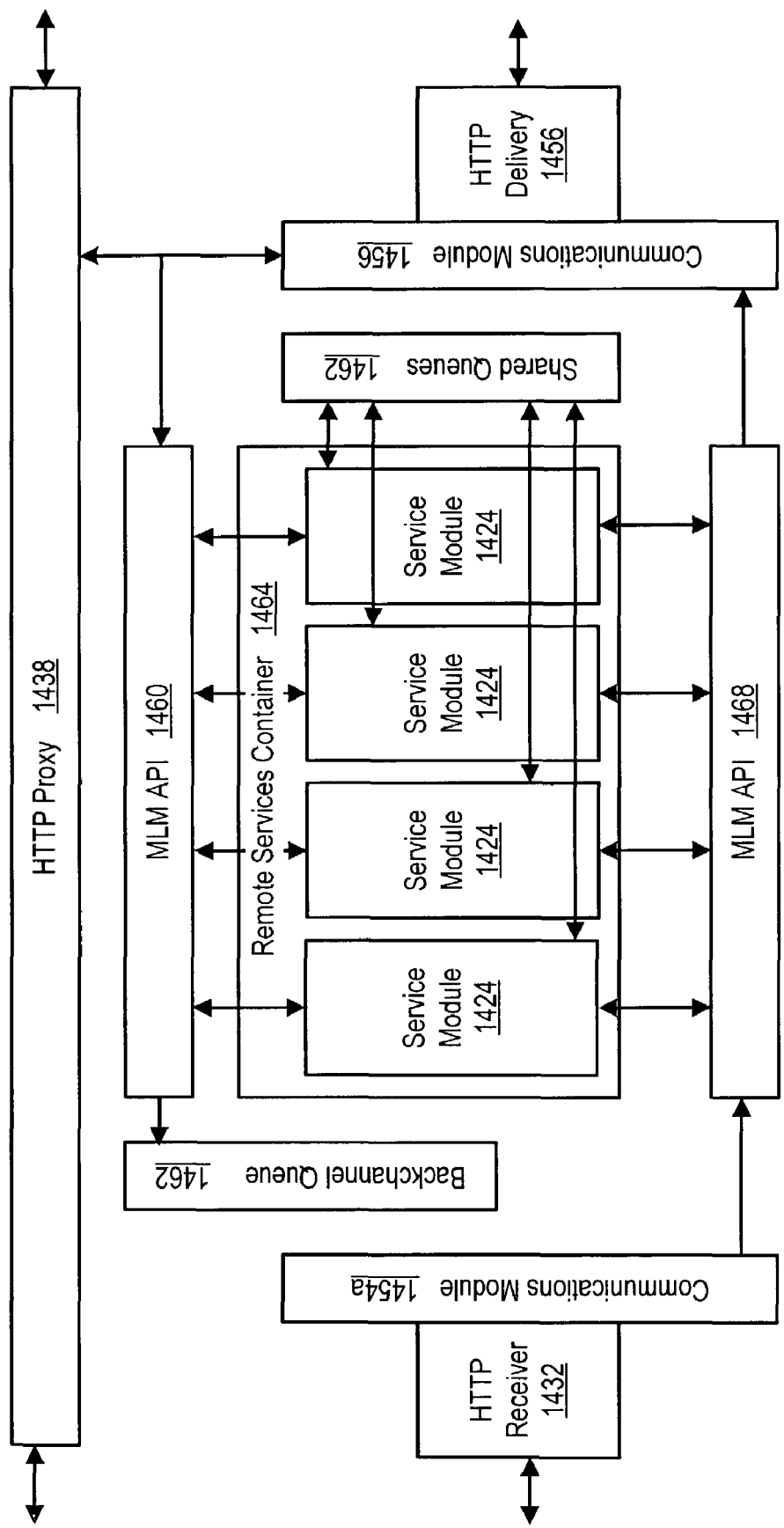
FIG. 15 shows a block diagram of the data flow of within an intermediate mid level manager.

FIG. 15 shows the data flow through an intermediate MLM 216. The MLM supports a plurality of different types of communication. The MLM supports a short message protocol, a bulk data transfer protocol, back-channel messages and software or configuration download. The MLM also supports an interactive session protocol and communication with the application server 226.

In the short message protocol XML messages are exchanged. With the bulk data transfer protocol, the connection between a proxy 210, an intermediate MLM 216 and an applications MLM 218 is uses for transferring large data objects. With back-channel messages, the communication mode of the MLM is based on a session mode. The back-channel messages enables the remote services system 100 to transmit messages to the customer via the HTTP back-channel. With software or configuration download is used when the communication mode of the MLM is based on session mode. This download enables the remote services system 100 to update the infrastructure 102. The four types of communication are discussed in more detail below.

The interactive session protocol is an open end to end connection between a proxy 210 and an applications MLM 218. this protocol is used for interactive applications such as a console login. The communications with the applications server 226 uses a web connector.

In all cases, the communication is initiated from the upstream (see FIG. 11). An MLM does not initiate communications with the proxy 210, an applications MLM 218 does not initiate communications with an intermediate MLM 216. Heartbeat messages are important for maintaining communications as the heartbeat messages enable establishing a back-channel communication path.

Because MLMs are the component transmitting and pre-processing data, the MLMs are horizontally scalable to provide MLM farms. Because multiple MLMs are implementing the same logical role, the MLMs share information when needed. The MLMs share a plurality of types of information: session statistics (for throttle control shared queue of short messages (for aggregation) and shared queue of back-channel short messages (for back-channel control).

The information is shared between MLMs from the same farm using the web server's session object. Each short message of a shared queue and the session statistics are represented using session objects and are automatically shared between all MLMs in the farm.

In a bulk data transfer in a farm environment, intermediate MLMs 216 of the same farm share information related to the transfer. More specifically, when an intermediate MLM 216 fetches the bulk data and sends the back-channel short messages to all the final destinations to request the final destinations to fetch the bulk data, the intermediate MLM 216 also stores the bulk data locally on the web server of the MLM and adds a shared session object describing this bulk data, including its local URL, the URL from which the data was fetched (e.g., from the applications MLM 218) and the reference of the bulk data.

When the destination of this bulk message receives the back-channel short message requesting the bulk data, the destination initiates the file download. Because the URL provided refers to the MLM farm, the bulk data transfer may be served by any MLM in that farm.

The MLM which receives the fetch request then looks at the session object to determine where this bulk data is stored, fetches the bulk data and sends the bulk data to the destination. This fetch is local between MLMs of the same farm, on the same LAN and without any network address translation or firewall.

If the MLM is not able to fetch the bulk data, then the MLM which originally fetched the data from the applications MLM 218 is down. In this case, a new MLM in the farm re-fetches the bulk data from the original applications MLM and updates the session object to show the new reference.

When the bulk data transfer is to a group of MLMs which are part of the same farm then the process starts by fetching the bulk data on one of the MLMs. The MLM then creates a session object to indicate to all other MLMs that are part of the same farm that these MLMs should fetch the bulk data. A similar recovery mechanism is used if the original receiver MLM crashes.

All of these bulk data distributions include the notion of acknowledgement of a download which then cleans-up the session object and the temporary fetched file. This acknowledgement includes an exception case where some destinations are not reachable. Providing the session object enables the MLM farms to be fully scalable and redundant.

FIGS. 16-19 show different deployment architectures for the mid level managers. The term "farms" indicates a horizontally scalable architecture. The number of possible combinations of features and location on the data path is large. To simplify understanding of the possible combinations, distinct combinations, referred to as roles, are defined. The role of a mid level manager is determined by two characteristics: the location of the MLM and the set of services offered by those roles that differentiate the role from other roles.

There are at least three different MLM locations as determined by the class of deployment infrastructure: customer, third party service provider, and service provider. When the MLM is located on the customer's site, upstream connections are typically on the customer's local area network. The downstream connection can be via a public WAN. The customer may enable auditing of all communications through an external logging and auditing facility. Locating an MLM at a third party service provider's site enables the service provider with the option of out-sourcing the management of its MLM farms. Both upstream and downstream communications are via a public WAN. When the MLM is located at the service provider, upstream communications is via a public WAN and downstream communication is via a private network. When the MLM is at the service provider location, the MLM is located behind the service provider's firewall.

By combining location and services, a plurality of roles may be defined, a customer MLM role, a service provider MLM role, an aggregation MLM role and an applications MLM role.

The customer MLM role supports remote services proxies within the customer's LAN. Aggregation and filtering is enabled. Auditing may be enabled to allow the customer to monitor communications with the service provider. The default security is minimal upstream (on the customer's LAN) and strong downstream (on the WAN). The customer MLM role functionality exists for infrastructure support. The customer MLM may be built to be a full service appliance by layering a series of service modules on top of the customer MLM using the service module API.

Figure 16:
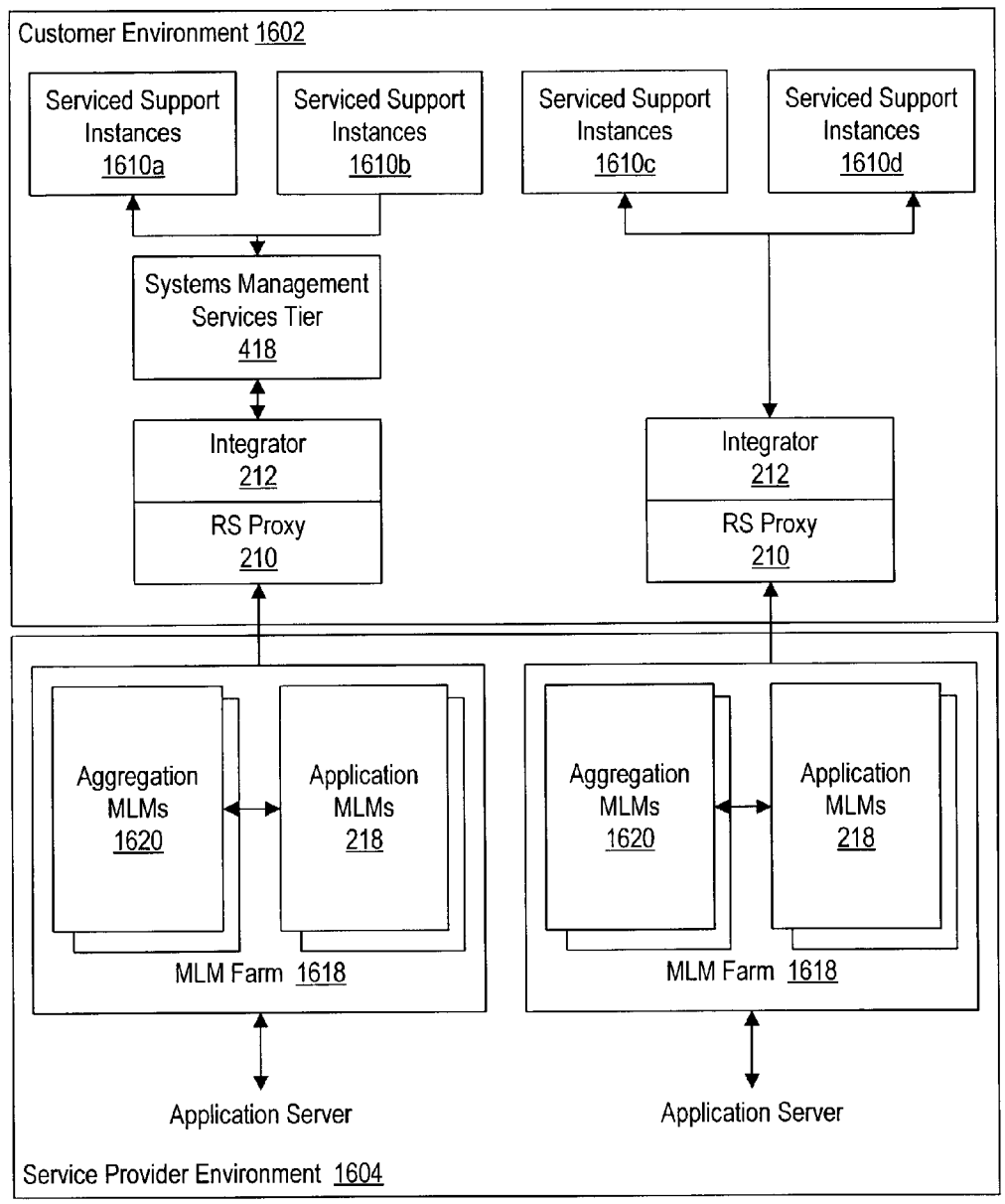
FIG. 16 shows a block diagram of the customer environment and a portion of the service provider environment of a class A deployment.

The service provider MLM role supports Class A deployments (as shown in FIG. 16) in which the customer has no onsite MLM (i.e., customer MLM). This role is a subclass of a customer MLM role with the difference between the customer MLM role and the service provider MLM role being that strong security is enabled upstream to the customer network.

The aggregation MLM role supports Class A deployments in which the customer has not onsite MLM. Filtering and aggregation are enabled. However, because the aggregation MLM may serve a plurality of customer installations, any filtering or aggregation performed is generic. Strong security is used to prevent access to customer data by unauthorized employees of the service provider.

The applications MLM role provides a data normalization and content generation point for the applications server 226. Strong security is enforced on upstream connections. Downstream connections use the necessary level of security to prevent access by unauthorized employees of the service provider. The applications MLM 218 may include plug-in applications for performing specific tasks.

Referring to FIG. 16, a block diagram of the customer environment 1602 and a portion of the service provider environment 1604 of a class A deployment is shown. More specifically, the customer environment 1602 includes a plurality of services support instances 1610a, 1610B, 1610c, 1610d which are coupled to integrators 212 either via a systems management services tier 418 (e.g., services support instances 1610a and 1610b) or directly (e.g., serviced support instances 1610c and 1610d). Integrators 212 are coupled to respective proxies 210. In a class A deployment, the proxy or proxies 210 are coupled to MLM farms 1618 within the service provider environment 1604. In a class A deployment, the MLM farms 1618 include aggregation MLMs 1620 and application MLMs 218. The MLM farms 1618 are then coupled to the application server 226 within the service provider environment 1604.

The class A deployment provides the simplest deployment for the remote services system deployments. This deployment provides lower end support customer and supports the simpler less mission critical services provided by the remote services system. Key features of a class A deployment include installation simplicity, low utilization footprint on customers devices, and uses customers network and infrastructure for network traffic routing. There are certain restrictions within a class A deployment including not supporting service modules that require local processing, not supporting centralized MLM communication auditing for the customer. A class A deployment uses and adds load to a customers network infrastructure components such as the customer's web proxies.

Figure 17:
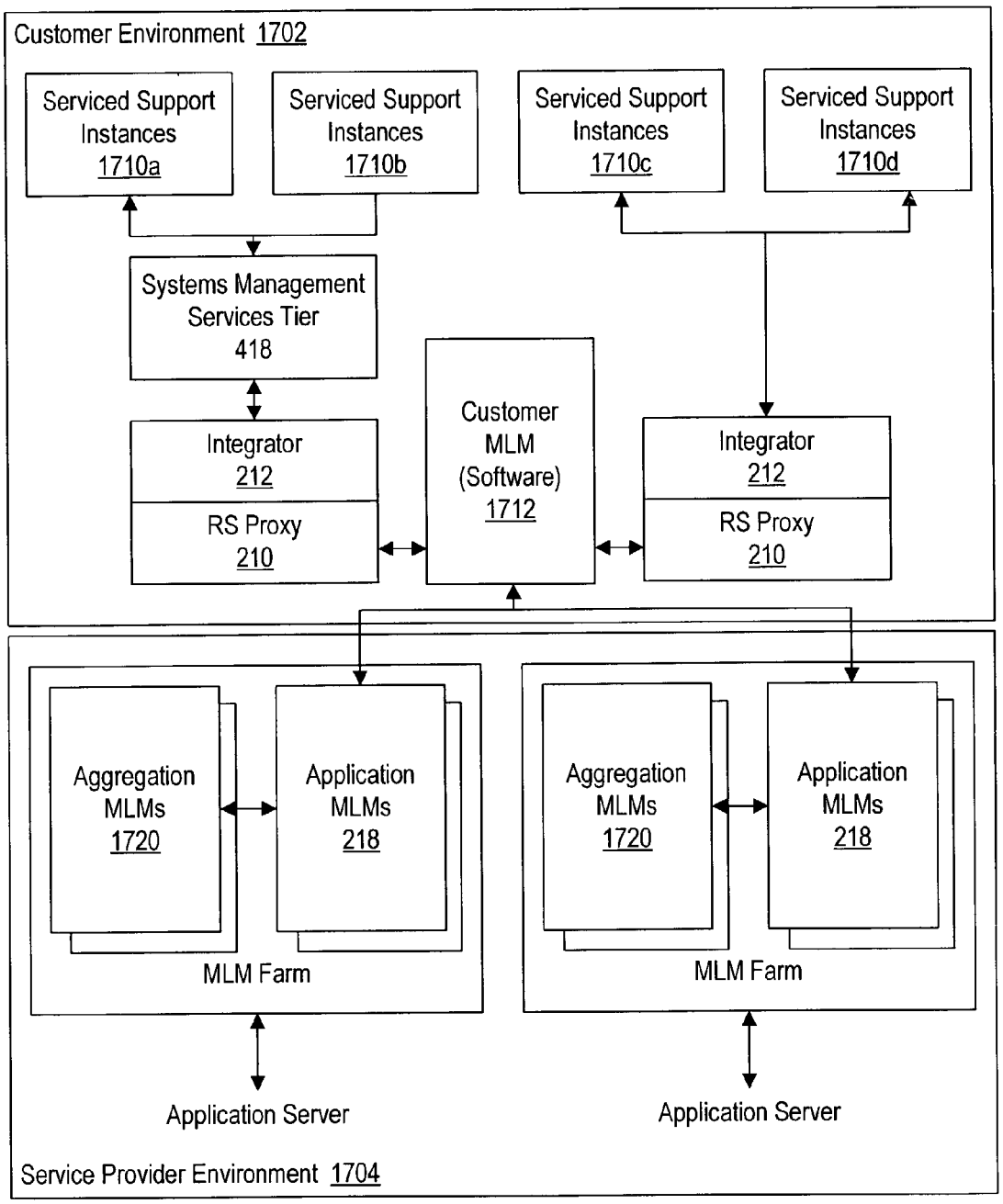
FIG. 17 shows a block diagram of the customer environment and a portion of the service provider environment of a class B deployment.

Referring to FIG. 17, a block diagram of the customer environment 1702 and a portion of the service provider environment 1704 of a class B deployment is shown. More specifically, the customer environment 1702 includes a plurality of services support instances 1710a, 1710B, 1710c, 1710d which are coupled to integrators 212 either via a systems management services tier 418 (e.g., services support instances 1710a and 1710b) or directly (e.g., serviced support instances 1710c and 1710d). Integrators 212 are coupled to respective proxies 210. In a class B deployment, the proxy or proxies 210 are coupled to a customer MLM 1712, which is a software instantiation of an intermediate MLM. The customer MLM 1712 is then coupled to the MLM farms 1718 within the service provider environment 1704 and specifically to the application MLMs 218 of the MLM farms 1718. In a class B deployment, the MLM farms 1718 include aggregation MLMs 1720 and application MLMs 218. The MLM farms 1718 are then coupled to the application server 226 within the service provider environment 1704. The class B deployment introduces a central authority customer MLM 1712 into the customer environment 1702. The software deployment of a customer MLM 1712 provides a lightweight installation of a customer MLM. The class B deployment provides the following additional features over a class A deployment. The class B deployment supports implementation of services that use in-customer WAN control over data sent through the remote services infrastructure. The class B deployment allows a customer to monitor outgoing and any incoming traffic through the customer MLM. The class B deployment provides a greater degree of infrastructure availability monitoring (because, e.g., the local customer MLM 1712 can contact remote services proxies more frequently via a LAN than would be possible across a WAN). The class B deployment provides better session management of data than a class A deployment. The class B deployment provides more centralized data flow through and out of the customer network. The class B deployment provides lower utilization of the customer network infrastructure to send data. The customer MLM 1712 provides a route in the network that alleviates the need to rely on a customer's web proxy configurations.

Figure 18:
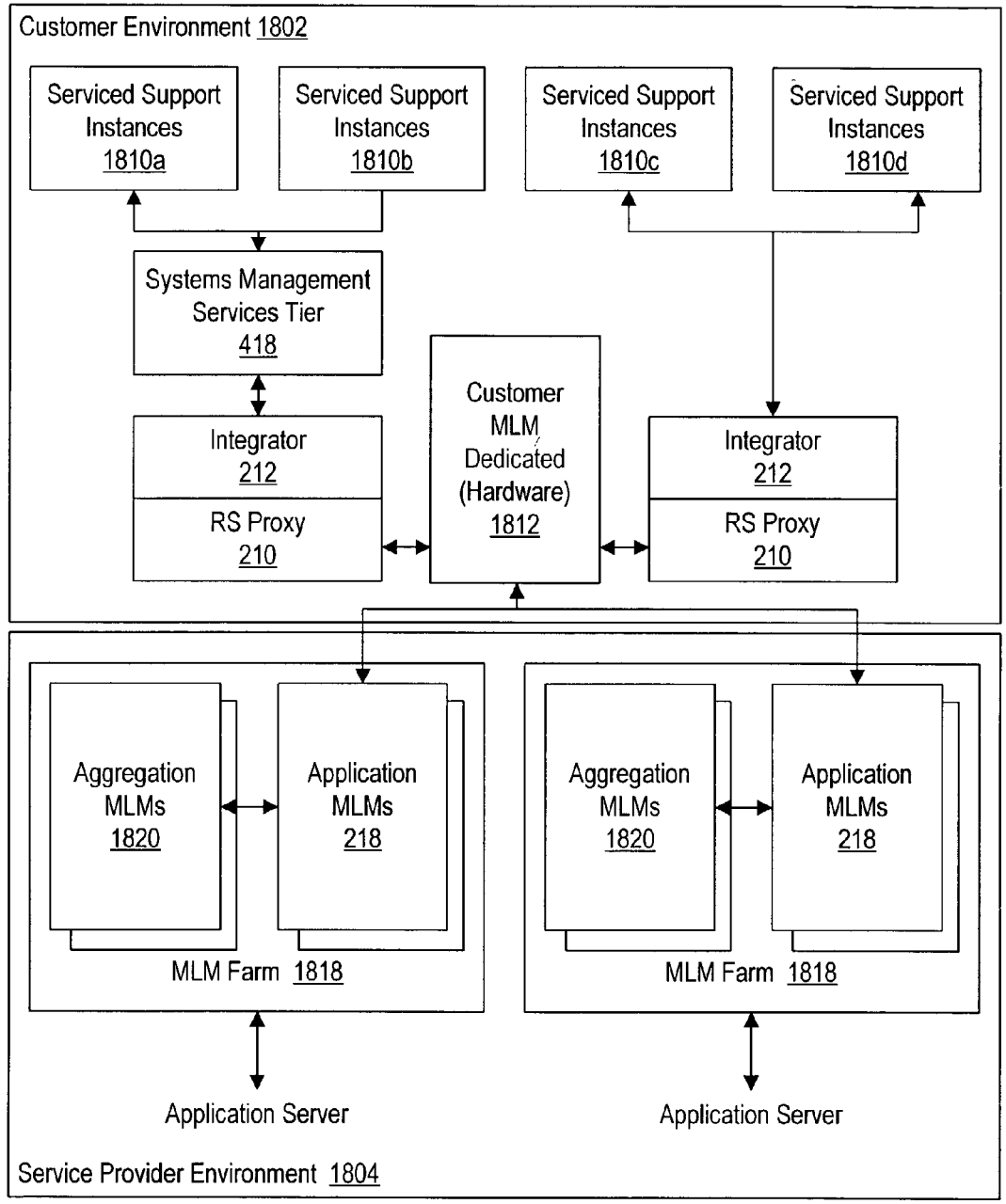
FIG. 18 shows a block diagram of the customer environment and a portion of the service provider environment of a class C deployment.

Referring to FIG. 18, a block diagram of the customer environment 1802 and a portion of the service provider environment 1804 of a class C deployment is shown. More specifically, the customer environment 1802 includes a plurality of services support instances 1810a, 1810B, 1810c, 1810d which are coupled to integrators 212 either via a systems management services tier 418 (e.g., services support instances 1810a and 1810b) or directly (e.g., serviced support instances 1810*c* and 1810*d*). Integrators 212 are coupled to respective proxies 210. In a class B deployment, the proxy or proxies 210 are coupled to a customer MLM 1812, which is a hardware instantiation of an intermediate MLM. The customer MLM 1812 is then coupled to the MLM farms 1818 within the service provider environment 1804 and specifically to the application MLMs 218 of the MLM farms 1818. In a class C deployment, the MLM farms 1818 include aggregation MLMs 1820 and application MLMs 218. The MLM farms 1818 are then coupled to the application server 226 within the service provider environment 1804.

The class C deployment is similar to the class B deployment except that the customer MLM functionality is provided by a dedicated hardware system. A hardware instantiation of a customer MLM 1812 is desirable when a customer desires a high level of availability assurance. A hardware instantiation of a customer MLM is desirable when a service module or modules place a significant processing load on the customer MLM. A hardware instantiation of a customer MLM is desirable when the security requirements of a service module make it desirable that the customer MLM be administered and perhaps even owned by the service provider.

Figure 19:
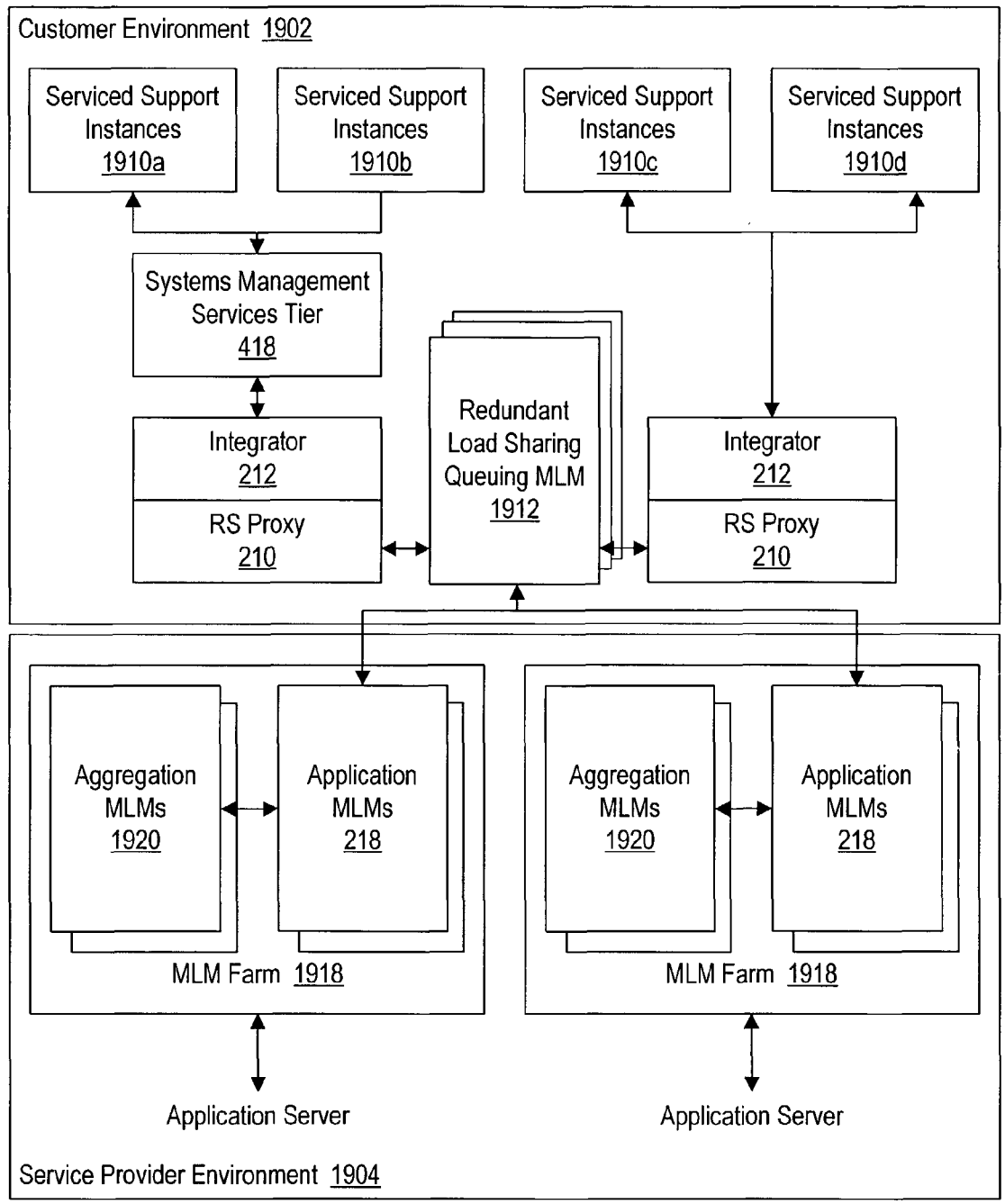
FIG. 19 shows a block diagram of the customer environment and a portion of the service provider environment of a class D deployment.

Referring to FIG. 19, a block diagram of the customer environment and a portion of the service provider environment of a class D deployment is shown. More specifically, the customer environment 1902 includes a plurality of services support instances 1910*a*, 1910B, 1910*c*, 1910*d* which are coupled to integrators 212 either via a systems management services tier 418 (e.g., services support instances 1910*a* and 1910*b*) or directly (e.g., serviced support instances 1910*c* and 1910*d*). Integrators 212 are coupled to respective proxies 210. In a class D deployment, the proxy or proxies 210 are coupled to a plurality of redundant customer MLM 1912, which may be either software or hardware instantiations of an intermediate MLM. The customer MLMs 1912 are then coupled to the MLM farms 1918 within the service provider environment 1904 and specifically to the application MLMs 218 of the MLM farms 1918. In a class D deployment, the MLM farms 1918 include aggregation MLMs 1920 and application MLMs 218. The MLM farms 1918 are then coupled to the application server 226 within the service provider environment 1904.

The class D deployment provides high availability and redundancy for the remote services system. The class D deployment uses multiple customer MLMs that are both redundant and load sharing. Communications sessions are not persistent and the remote services system may route each communication session through a different customer MLM if necessary. A class D deployment may build upon either a class B or a class C deployment. The redundancy is present regardless of whether the customer MLM is a software instantiation or a hardware instantiation.

Other Embodiments

Other embodiments are within the following claims.

What is claimed is:

1. A remote services architecture comprising:
    a remote services proxy, the remote services proxy providing communications flow management;
    an intermediate mid level manager, the intermediate mid level manager providing data queue management, transaction integrity and redundancy, the intermediate mid level manager being scalable to a customer location or a service provider location based upon needs of the customer;
    an applications mid level manager, the applications mid level manager providing data normalization and integration with a mail server data flow; and
    an application server coupled to the remote services proxy, the application server providing persistent storage of remote services infrastructure information.

2. The remote services architecture of claim 1 wherein the intermediate mid level manager module is a customer mid level manager module.

3. The remote services architecture of claim 1 wherein the intermediate mid level manager module is an aggregation mid level manager module.

4. The remote services architecture of claim 1 further comprising:
    a certificate management system, the certificate management system providing management of certificates to verify connection authentication for the remote services infrastructure.

5. The remote services architecture of claim 1 further comprising:
    a remote services content generation mid level manager module, the remote services content generation mid level manager module providing content based on data held within the remote services application server module.

6. The remote services architecture of claim 1 further comprising:
    a remote services bandwidth management system, the remote services bandwidth management system controlling bandwidth usage and data prioritization for communication between the intermediate mid level manager and the applications mid level manager.

7. The remote services architecture of claim 6 wherein the remote services bandwidth management system is located within the intermediate mid level manager.

8. A remote services system comprising:
    proxy means for providing communications flow management;
    intermediate mid level manager means for providing data queue management, transaction integrity and redundancy, the intermediate mid level manager being scalable to a customer location or a service provider location based upon needs of the customer;
    applications mid level manager means for providing data normalization and integration with a mail server data flow; and
    application server means coupled to the remote services proxy for providing persistent storage of remote services infrastructure information.

9. The remote services system of claim 8 wherein the intermediate mid level manager means is a customer mid level manager means.

10. The remote services system of claim 8 wherein the intermediate mid level manager module is an aggregation mid level manager module.

11. The remote services system of claim 8 further comprising:
    means for certificate management, the means for certificate management providing management of certificates to verify connection authentication for the remote services infrastructure.

12. The remote services system of claim 8 further comprising:
    remote services content generation mid level manager means for providing content based on data held within the remote services application server module.

13. The remote services system of claim 8 further comprising:
    means for a remote services bandwidth management, the means for remote services bandwidth management controlling bandwidth usage and data prioritization for communication between the intermediate mid level manager means and the applications mid level manager means.

14. The remote services system of claim 8 wherein the means for remote services bandwidth management is located within the intermediate mid level manager means.

15. A method for providing remote services comprising:
providing communications flow management via a remote services proxy;
providing, via an intermediate mid level manager, data queue management, transaction integrity and redundancy,
scaling the intermediate mid level manager to a customer location or a service provider location based upon needs of the customer;
providing, via an applications mid level manager, data normalization and integration with a mail server data flow; and
providing, via an application server, persistent storage of remote services infrastructure information.

16. The method of claim 15 wherein the intermediate mid level manager is a customer mid level manager means.

17. The method of claim 15 wherein the intermediate mid level manager is an aggregation mid level manager module.

18. The method of claim 15 further comprising:
providing management of certificates to verify connection authentication for the remote services infrastructure.

19. The method of claim 15 further comprising:
providing content based on data held within the remote services application server.

20. The method of claim 15 further comprising:
controlling bandwidth usage and data prioritization for communication between the intermediate mid level manager and the applications mid level manager.

21. The method of claim 20 wherein
the controlling bandwidth usage and data prioritization is performed within the intermediate mid level manager.

* * * * *

UNITED STATES PATENT AND TRADEMARK OFFICE
CERTIFICATE OF CORRECTION

| | | |
|---|---|---|
| PATENT NO. | : 8,266,239 B2 | Page 1 of 1 |
| APPLICATION NO. | : 10/186073 | |
| DATED | : September 11, 2012 | |
| INVENTOR(S) | : Wookey et al. | |

It is certified that error appears in the above-identified patent and that said Letters Patent is hereby corrected as shown below:

In column 22, line 37-59, delete "The class B deployment introduces............web proxy configurations." and insert the same below "1704." on Col. 22, Line 38 as a new paragraph.

Signed and Sealed this
Eighteenth Day of December, 2012

David J. Kappos
*Director of the United States Patent and Trademark Office*